US006968540B2

(12) United States Patent
Beck et al.

(10) Patent No.: US 6,968,540 B2
(45) Date of Patent: Nov. 22, 2005

(54) SOFTWARE INSTRUMENTATION METHOD AND APPARATUS

(75) Inventors: Ralph L. Beck, Sterling, MA (US); Michael Walter Romanchuk, Mont Vernon, NH (US)

(73) Assignee: OPNET Technologies Inc., Nashua, NH (US)

( * ) Notice: Subject to any disclaimer, the term of this patent is extended or adjusted under 35 U.S.C. 154(b) by 694 days.

(21) Appl. No.: 09/879,838

(22) Filed: Jun. 12, 2001

(65) Prior Publication Data

US 2002/0049963 A1    Apr. 25, 2002

Related U.S. Application Data

(60) Provisional application No. 60/243,087, filed on Oct. 25, 2000.

(51) Int. Cl.[7] ............................................... G06F 9/44
(52) U.S. Cl. ..................... 717/130; 717/116; 717/127
(58) Field of Search ................... 717/130, 116, 118, 717/166, 115, 158, 137, 124–129; 714/38; 702/186

(56) References Cited

U.S. PATENT DOCUMENTS

| | | | |
|---|---|---|---|
| 4,821,220 A | 4/1989 | Duisberg | |
| 5,062,055 A | 10/1991 | Chinnaswamy et al. | 364/513 |
| 5,101,348 A | 3/1992 | Arrowood et al. | 395/200 |
| 5,161,116 A | 11/1992 | Schneider et al. | 364/551.01 |
| 5,307,499 A | 4/1994 | Yin | |
| 5,367,473 A | 11/1994 | Chu et al. | 364/551.01 |
| 5,375,070 A | 12/1994 | Hershey et al. | 364/550 |
| 5,432,932 A | 7/1995 | Chen et al. | 395/650 |
| 5,450,406 A | 9/1995 | Esaki et al. | 370/60.1 |
| 5,459,837 A | 10/1995 | Caccavale | 395/184.01 |
| 5,459,868 A | 10/1995 | Fong | |
| 5,475,625 A | 12/1995 | Glaschick | 395/600 |
| 5,475,843 A | 12/1995 | Halviatti et al. | |
| 5,483,468 A | 1/1996 | Chen et al. | 364/551.01 |
| 5,491,791 A | 2/1996 | Glowny et al. | 395/183.13 |
| 5,504,921 A | 4/1996 | Dev et al. | 395/800 |
| 5,506,955 A | 4/1996 | Chen et al. | 395/183.02 |
| 5,513,126 A | 4/1996 | Harkins et al. | 364/514 A |
| 5,553,235 A | 9/1996 | Chen et al. | 395/182.18 |
| 5,555,191 A | 9/1996 | Hripcsak | 364/514 R |
| 5,572,672 A | 11/1996 | Dewitt et al. | 395/184.01 |
| 5,581,482 A | 12/1996 | Wiedenman et al. | 364/551.01 |

(Continued)

FOREIGN PATENT DOCUMENTS

DE    296 00 609 U 1    3/1997

(Continued)

OTHER PUBLICATIONS

Stegawski et al., A new virtual-instrumetation-base exeperimenting environment for undergraduate laboratories with application in research and manufacturing, 1997, IEEE, p. 1418-1421.*

(Continued)

*Primary Examiner*—Tuan Dam
*Assistant Examiner*—Satish S. Rampuria
(74) *Attorney, Agent, or Firm*—Davis & Bujold, P.L.L.C.

(57) ABSTRACT

Methods and an apparatus for instrumenting object oriented software that do not require modification to existing source code or to executable files, nor do they require modification to any existing sequences of object resident instructions. Methods include the class interceptor, doppelganger and method hijacking software instrumentation techniques. The class interceptor technique intercepts and monitors the paths of execution associated with methods inherited by a target class. The class doppelganger technique intercepts and monitors the paths of execution entering a target class. The method hijacking technique creates and adds instrumented methods directly to a target class.

14 Claims, 14 Drawing Sheets

U.S. PATENT DOCUMENTS

| | | | | |
|---|---|---|---|---|
| 5,581,696 | A | 12/1996 | Kolawa et al. | 395/183.14 |
| 5,586,254 | A | 12/1996 | Kondo et al. | 395/200.1 |
| 5,598,429 | A | 1/1997 | Marshall | 375/210 |
| 5,615,135 | A | 3/1997 | Waclawsky et al. | 364/551.01 |
| 5,615,323 | A | 3/1997 | Engel et al. | 395/140 |
| 5,616,904 | A | 4/1997 | Fernadez | 235/449 |
| 5,619,656 | A | 4/1997 | Graf | 395/200.11 |
| 5,621,663 | A | 4/1997 | Skagerling | 364/550 |
| 5,634,009 | A | 5/1997 | Iddon et al. | 395/200.11 |
| 5,655,081 | A | 8/1997 | Bonnell et al. | 395/200.32 |
| 5,661,668 | A | 8/1997 | Yemini et al. | 364/550 |
| 5,668,944 | A | 9/1997 | Berry | 395/184.01 |
| 5,675,510 | A | 10/1997 | Coffey et al. | 364/514 A |
| 5,684,945 | A | 11/1997 | Chen et al. | 395/182.18 |
| 5,696,486 | A | 12/1997 | Poliquin et al. | 340/506 |
| 5,696,701 | A | 12/1997 | Burgess et al. | 364/551.01 |
| 5,699,403 | A | 12/1997 | Ronnen | 379/32 |
| 5,732,273 | A | 3/1998 | Srivastava et al. | |
| 5,740,441 | A | 4/1998 | Yellin et al. | |
| 5,748,098 | A | 5/1998 | Grace | 340/825.16 |
| 5,752,062 | A | 5/1998 | Gover et al. | 355/800 |
| 5,758,071 | A | 5/1998 | Burgess et al. | 395/200.5 |
| 5,778,230 | A | 7/1998 | Wimble et al. | 395/704 |
| 5,796,663 | A | 8/1998 | Park et al. | 365/200 |
| 5,799,154 | A | 8/1998 | Kuriyan | 395/200.53 |
| 5,802,256 | A | 9/1998 | Heckerman et al. | 395/75 |
| 5,815,718 | A | 9/1998 | Tock | |
| 5,819,028 | A | 10/1998 | Manghirmalani et al. | 395/185.1 |
| 5,832,270 | A * | 11/1998 | Laffra et al. | 717/125 |
| 5,845,125 | A | 12/1998 | Nishimura et al. | 395/704 |
| 5,850,388 | A | 12/1998 | Anderson et al. | 370/252 |
| 5,870,540 | A | 2/1999 | Wang et al. | 395/183.19 |
| 5,896,536 | A | 4/1999 | Lindsey | 395/704 |
| 5,901,315 | A | 5/1999 | Edwards et al. | 395/704 |
| 5,923,834 | A | 7/1999 | Thieret et al. | 395/183.01 |
| 5,940,618 | A * | 8/1999 | Blandy et al. | 717/128 |
| 5,948,113 | A | 9/1999 | Johnson et al. | 714/38 |
| 5,956,662 | A | 9/1999 | Hemker et al. | 702/182 |
| 5,974,237 | A | 10/1999 | Shurmer et al. | 395/200.54 |
| 5,974,457 | A | 10/1999 | Waclawsky et al. | 709/224 |
| 5,978,594 | A | 11/1999 | Bonnell et al. | 395/837 |
| 5,987,249 | A * | 11/1999 | Grossman et al. | 717/130 |
| 5,987,250 | A * | 11/1999 | Subrahmanyam | 717/130 |
| 5,991,881 | A | 11/1999 | Conklin et al. | 713/201 |
| 6,021,437 | A | 2/2000 | Chen et al. | 709/224 |
| 6,026,234 | A | 2/2000 | Hanson et al. | 395/704 |
| 6,026,237 | A * | 2/2000 | Berry et al. | 717/130 |
| 6,028,842 | A | 2/2000 | Chapman et al. | 370/235 |
| 6,042,614 | A | 3/2000 | Davidson et al. | 717/4 |
| 6,044,335 | A | 3/2000 | Ksendzov | 702/182 |
| 6,058,102 | A | 5/2000 | Drysdale et al. | 370/252 |
| 6,058,393 | A | 5/2000 | Meier et al. | 707/10 |
| 6,061,518 | A | 5/2000 | Hoffman | 395/704 |
| 6,067,412 | A | 5/2000 | Blake et al. | 395/672 |
| 6,072,777 | A | 6/2000 | Bencheck et al. | 370/244 |
| 6,072,953 | A * | 6/2000 | Cohen et al. | 717/166 |
| 6,073,089 | A | 6/2000 | Baker et al. | 702/185 |
| 6,076,083 | A | 6/2000 | Baker | 706/52 |
| 6,081,797 | A | 6/2000 | Hittt | 706/25 |
| 6,085,029 | A | 7/2000 | Kolawa et al. | 395/183.14 |
| 6,106,572 | A | 8/2000 | Halpern | 717/4 |
| 6,108,800 | A | 8/2000 | Asawa | 714/47 |
| 6,115,393 | A | 9/2000 | Engel et al. | 370/469 |
| 6,118,936 | A | 9/2000 | Lauer et al. | 395/200.53 |
| 6,118,940 | A | 9/2000 | Alexander, III et al. | 395/704 |
| 6,119,074 | A | 9/2000 | Sarangapani | 702/185 |
| 6,119,247 | A | 9/2000 | House et al. | 714/38 |
| 6,126,330 | A * | 10/2000 | Knight | 717/127 |
| 6,138,122 | A | 10/2000 | Smith et al. | 707/103 |
| 6,139,198 | A | 10/2000 | Danforth et al. | 395/704 |
| 6,145,121 | A | 11/2000 | Levy et al. | 717/4 |
| 6,149,318 | A | 11/2000 | Chase et al. | 395/704 |
| 6,151,701 | A | 11/2000 | Humphreys et al. | 717/4 |
| 6,154,736 | A | 11/2000 | Chickering et al. | 706/59 |
| 6,161,200 | A | 12/2000 | Rees et al. | 714/38 |
| 6,167,398 | A | 12/2000 | Wyard et al. | 707/5 |
| 6,182,022 | B1 | 1/2001 | Mayle et al. | 702/182 |
| 6,182,157 | B1 | 1/2001 | Schlener et al. | 709/318 |
| 6,189,142 | B1 * | 2/2001 | Johnston et al. | 717/125 |
| 6,216,119 | B1 | 4/2001 | Jannarone | 706/26 |
| 6,216,237 | B1 * | 4/2001 | Klemm et al. | 714/38 |
| 6,222,652 | B1 | 4/2001 | Roberts | 359/110 |
| 6,249,755 | B1 | 6/2001 | Yemini et al. | 702/183 |
| 6,263,298 | B1 | 7/2001 | Kerman et al. | 702/186 |
| 6,263,491 | B1 * | 7/2001 | Hunt | 717/130 |
| 6,269,401 | B1 | 7/2001 | Fletcher et al. | 709/224 |
| 6,314,558 | B1 * | 11/2001 | Angel et al. | 717/118 |
| 6,320,585 | B1 | 11/2001 | Engel et al. | 345/440 |
| 6,327,550 | B1 | 12/2001 | Vinberg et al. | 702/186 |
| 6,327,677 | B1 | 12/2001 | Garg et al. | 714/37 |
| 6,359,976 | B1 | 3/2002 | Kalyanpur et al. | 379/134 |
| 6,377,907 | B1 | 4/2002 | Waclawski | 702/182 |
| 6,381,306 | B1 | 4/2002 | Lawson et al. | 379/32.01 |
| 6,405,250 | B1 | 6/2002 | Lin et al. | 709/224 |
| 6,405,367 | B1 * | 6/2002 | Bryant et al. | 717/115 |
| 6,438,744 | B2 * | 8/2002 | Toutonghi et al. | 717/137 |
| 6,446,058 | B1 | 9/2002 | Brown | 706/60 |
| 6,453,346 | B1 | 9/2002 | Garg et al. | 709/224 |
| 6,466,929 | B1 | 10/2002 | Brown et al. | 706/48 |
| 6,470,464 | B2 | 10/2002 | Bertram et al. | 714/37 |
| 6,481,008 | B1 * | 11/2002 | Chaiken et al. | 717/158 |
| 6,484,129 | B2 | 11/2002 | Klein et al. | 702/186 |
| 6,505,246 | B1 | 1/2003 | Land et al. | 709/224 |
| 6,507,805 | B1 * | 1/2003 | Gordon et al. | 702/186 |
| 6,513,065 | B1 | 1/2003 | Hafez et al. | 709/224 |
| 6,631,518 | B1 * | 10/2003 | Bortnikov et al. | 717/158 |
| 6,662,359 | B1 * | 12/2003 | Berry et al. | 717/130 |
| 6,721,941 | B1 * | 4/2004 | Morshed et al. | 717/127 |
| 6,742,178 | B1 * | 5/2004 | Berry et al. | 717/130 |
| 6,760,903 | B1 * | 7/2004 | Morshed et al. | 717/130 |
| 2001/0052087 | A1 | 12/2001 | Garg et al. | 714/37 |
| 2002/0012011 | A1 | 1/2002 | Roytman et al. | 345/736 |
| 2002/0019870 | A1 | 2/2002 | Chirashnya et al. | 709/224 |
| 2002/0049838 | A1 | 4/2002 | Sylor et al. | 709/224 |
| 2002/0054169 | A1 | 5/2002 | Richardson | 345/854 |
| 2002/0090134 | A1 | 7/2002 | Van Zon | 382/181 |
| 2002/0095661 | A1 | 7/2002 | Angel et al. | 717/130 |
| 2002/0111755 | A1 | 8/2002 | Valadarsky et al. | 702/58 |
| 2002/0123865 | A1 | 9/2002 | Whitney et al. | 702/189 |
| 2002/0133757 | A1 | 9/2002 | Bertram et al. | 714/47 |
| 2002/0152185 | A1 | 10/2002 | Satish Jamadagni | 706/1 |
| 2002/0152304 | A1 | 10/2002 | Collazo | 709/224 |
| 2002/0152305 | A1 | 10/2002 | Jackson et al. | 709/224 |
| 2002/0158918 | A1 | 10/2002 | Feibush et al. | 345/853 |
| 2002/0159386 | A1 | 10/2002 | Grosdidier et al. | 370/229 |
| 2002/0165892 | A1 | 11/2002 | Grumann et al. | 709/100 |
| 2002/0169870 | A1 | 11/2002 | Vosseler et al. | 709/224 |
| 2002/0173997 | A1 | 11/2002 | Menard et al. | 705/7 |
| 2002/0174174 | A1 | 11/2002 | Ramraj et al. | 709/203 |
| 2002/0183972 | A1 | 12/2002 | Enck et al. | 702/186 |
| 2002/0184065 | A1 | 12/2002 | Menard et al. | 705/7 |
| 2002/0184615 | A1 | 12/2002 | Sumner et al. | 717/130 |
| 2002/0198879 | A1 | 12/2002 | Schwarcz | 707/10 |
| 2002/0198985 | A1 | 12/2002 | Fraenkel et al. | 709/224 |
| 2003/0005362 | A1 | 1/2003 | Miller et al. | 714/27 |
| 2003/0009507 | A1 | 1/2003 | Shum | 709/104 |
| 2003/0014692 | A1 | 1/2003 | James et al. | 714/25 |
| 2003/0018241 | A1 | 1/2003 | Mannheimer | 600/300 |
| 2003/0018494 | A1 | 1/2003 | Bronstein et al. | 705/2 |
| 2003/0023712 | A1 | 1/2003 | Zhao et al. | 709/223 |
| 2003/0028631 | A1 | 2/2003 | Rhodes | 709/224 |

| | | | |
|---|---|---|---|
| 2003/0033404 A1 | 2/2003 | Richardson | 709/224 |
| 2004/0133882 A1* | 7/2004 | Angel et al. | 717/130 |

FOREIGN PATENT DOCUMENTS

| | | |
|---|---|---|
| WO | WO 96/12224 | 4/1996 |

OTHER PUBLICATIONS

Radhakrishnan et al., Characterization of Java applications at bytecode and ultra-SPARC machine code levels, 1999, IEEE, p. 281-284.*

Cheikes et al., Software Instrumentation for Intelligent Embedded Training, Mitre Corp., Jun. 2001, pp:1-11.*

Vo et al., Xept: a software Instrumentation method for exception handling, IEEE, Nov. 2-5, 1997, Page(s):60-69.*

Fryer et al., FPGA Based CPU Instrumentation for Hard Real-Time Embedded System Testing, Google.com (www.cs.virginia.edu/sigbed/archives/2005-04/wip10.pdf), pp:1-4.*

Rundensteiner, E.A., "Design Tool Integration Using Object-Oriented Database Views," IEEE, 1993, pp. 104-107.

Epstein et al., "Educator's Symposium-Introducing Object-orientedness into a Breadth-first Introductory Curriculum," OOPSLA 1992, Addendum to the Proceedings, Vancouver, British Columbia, Canada, Oct. 5-10, 1992, pp. 293-298.

Parthasarathy, et al., "NetProf: Network-based High-level Profiling of Java Bytecode", Technical Report 622, May 1996 pp. 1-14.

Anonymous, "Jikes Bytecode Toolkit," Internet, Mar. 31, 2000.

Lee, et al., "BIT: A Tool for Instrumenting Java Bytecodes," University of Colorado, Department of Computer Science, Aug. 12, 1997, pp. 73-82.

Thottan, et al., "Adaptive Thresholding for Proactive Network Problem Detection," Rensselaer Polytechnic Institute, Department of Electrical, Computer, and Systems Engineering.

Hellerstein, et al., "Characterizing Normal Operation of a Web Server: Application to Workload Forecasting and Problem Detection," Proceedings of the Computer Measurement Group, 1998.

Peterson, et al., "Fractal Patterns in DASD I/O Traffic.".

Grummitt, Adam, "Automated Performance Management Advice Using Computational Intelligence," Metron Technology Limited.

Buzen, et al., "MASF—Multivariate Adaptive Statistical Filtering," BGS Systems, Inc.

Wheeler, Robert E., "Quantile Estimators of Johnson Curve Parameters," E.I. du Pont de Nemours & Co.

Chou, et al., "Transforming Non-Normal Data to Normality in Statistical Process Control," Journal of Quality Technology, 1998, vol. 30, No. 2.

Shapiro, Samuel S., "How to Test Normality and Other Distributional Assumptions," American Society for Quality Control, Statistics Division, 1990.

DataMyte Handbook, "Non-Normal Distributions, Johnson Transformations," DataMyte Business, Allen-Bradley Company, Inc., Chapter 6, 1995.

Gunther, Neil J., "The Practical Performance Analyst—Performance-By-Design Techniques for Distributed Systems," 1998, p. 12-15.

Walpole, et al., "Probability and Statistics for Engineers and Scientists," 1998, p. 213-215, 340-343.

DataMyte Handbook, "Control Charts," Chapter 2; "Constants for Calculating Control Limits," Appendix-Table A-1, DataMyte Business, Allen-Bradley Company, Inc., 1987.

Gilchrist, Warren G., "Statistical Modeling With Quantile Functions," chapter 1—An Overview, p. 1-17; chapter 2-Describing a Sample, p. 43-50, 2000.

Press, et al., "Numerical Recipes in C," Second Edition, chapter 6- Special Functions, p. 212-222; chapter 14- Statistical Description of Data—Nonparametric or Rank Correlation, p. 639-642, 1992.

Evans, et al., "Statistical Distributions," Third Edition, chapter 19- Gamma Distribution, p. 98-105, 2000.

Papoulis, Athanasios, "Probability, Random Variables, and Stochastic Processes," chapter 5—Functions of One Random Variable, p. 116-127, 1965.

Han, et al., "Datat Mining Concepts and Techniques," chapter 8- Cluster Analysis, p. 335-393, 2001.

* cited by examiner

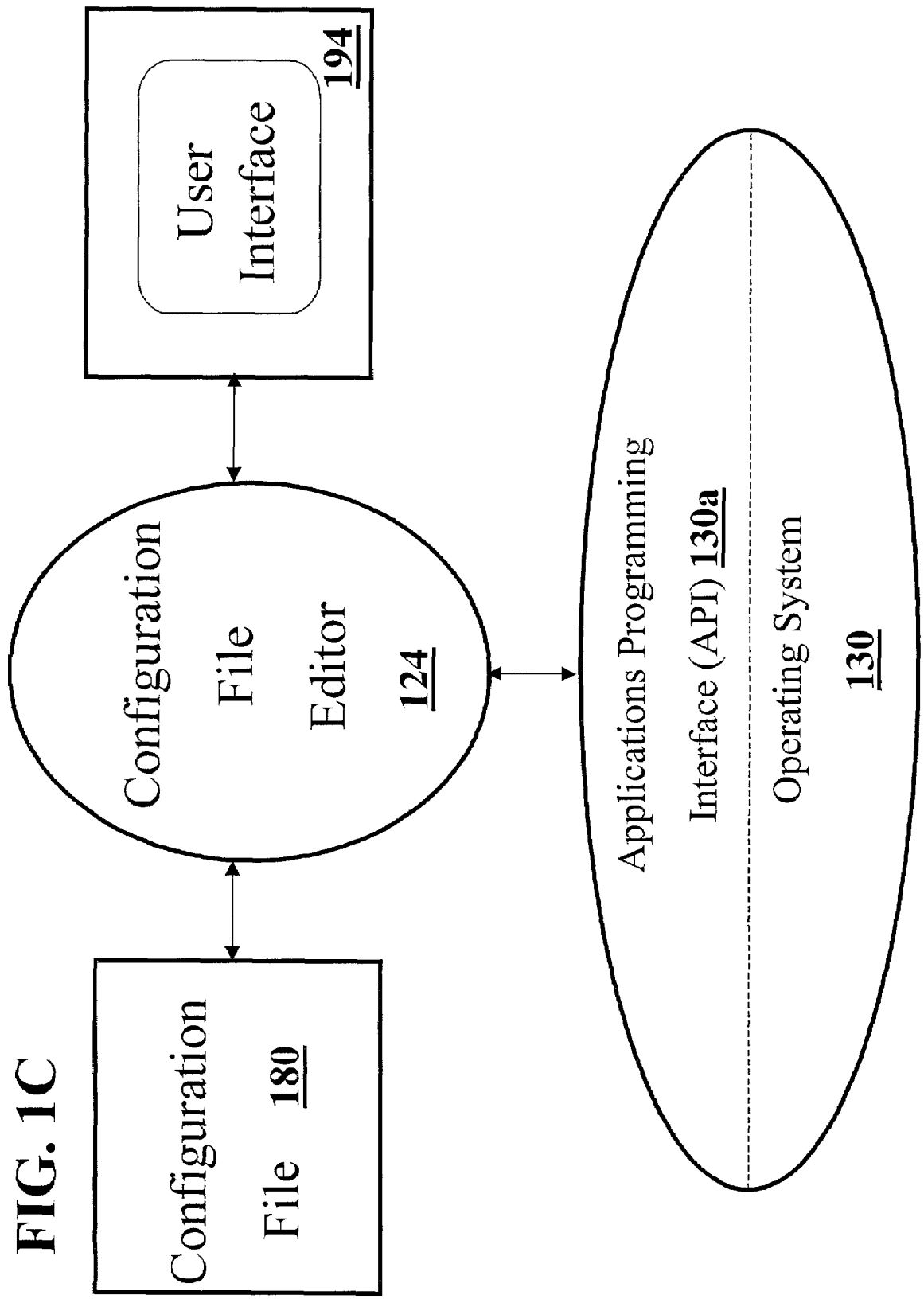

FIG. 4  Class/Object Internal Components

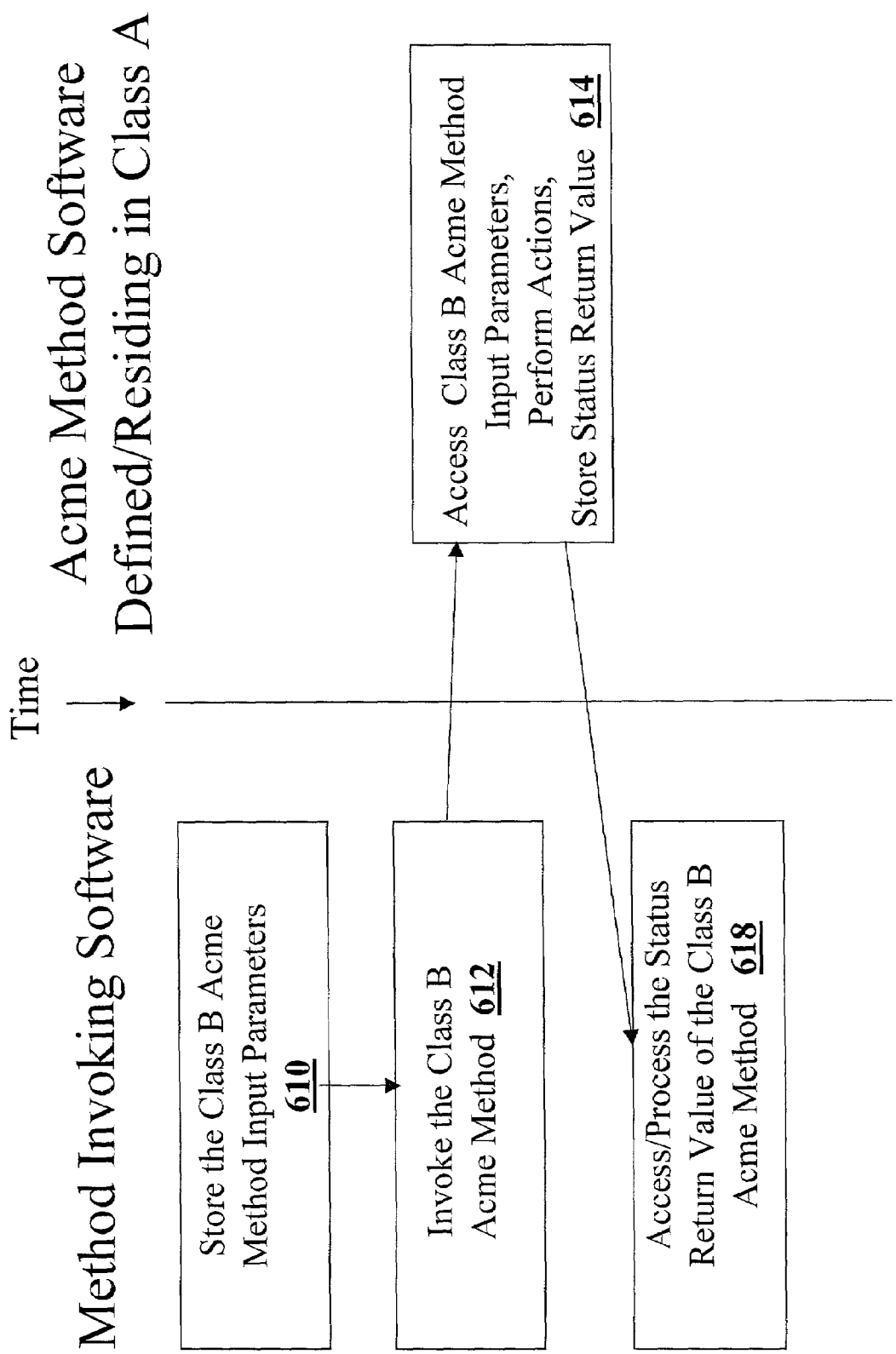
FIG. 6    Fully Inherited Method Invocation

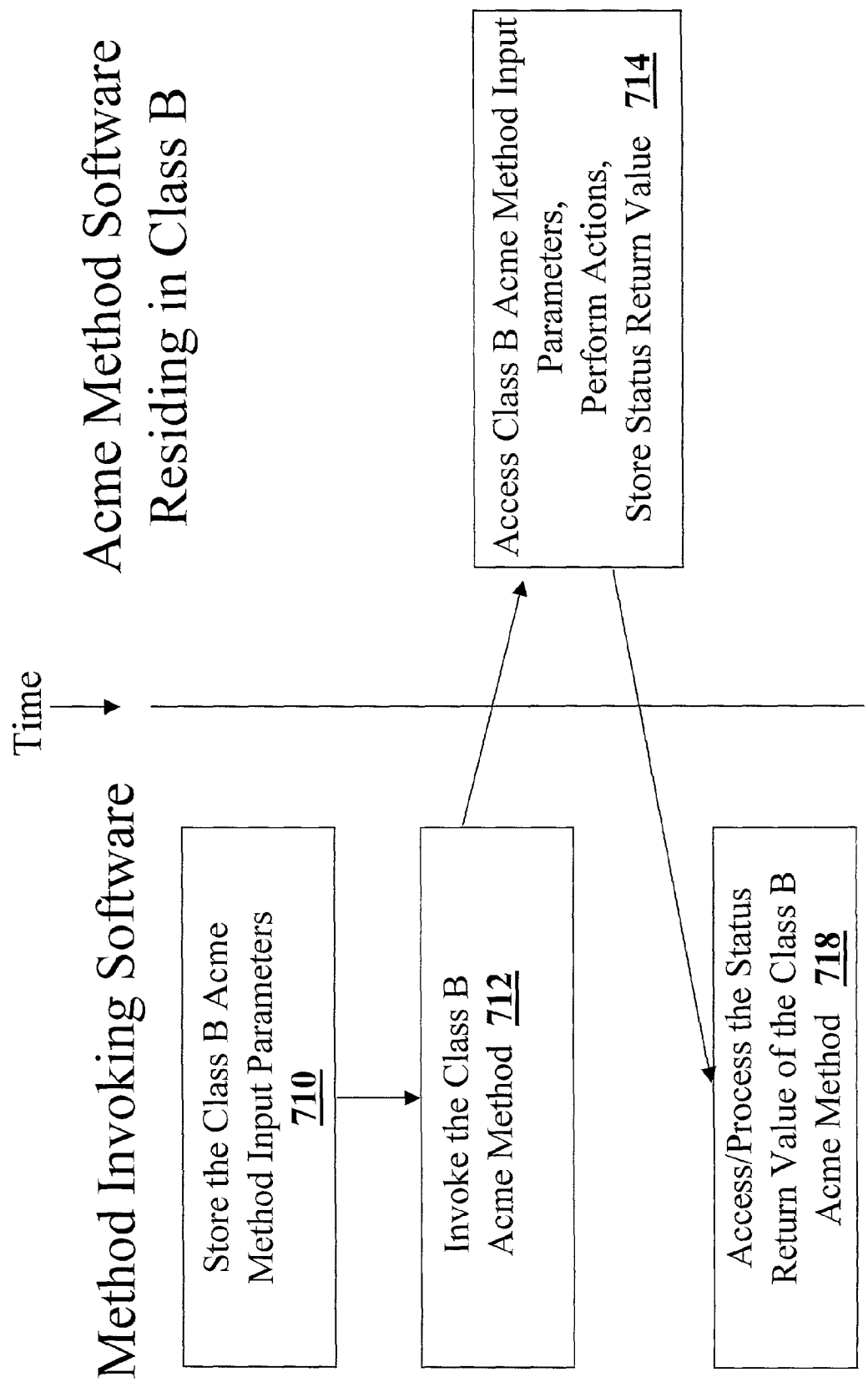
FIG. 7  Fully Overridden Method Invocation

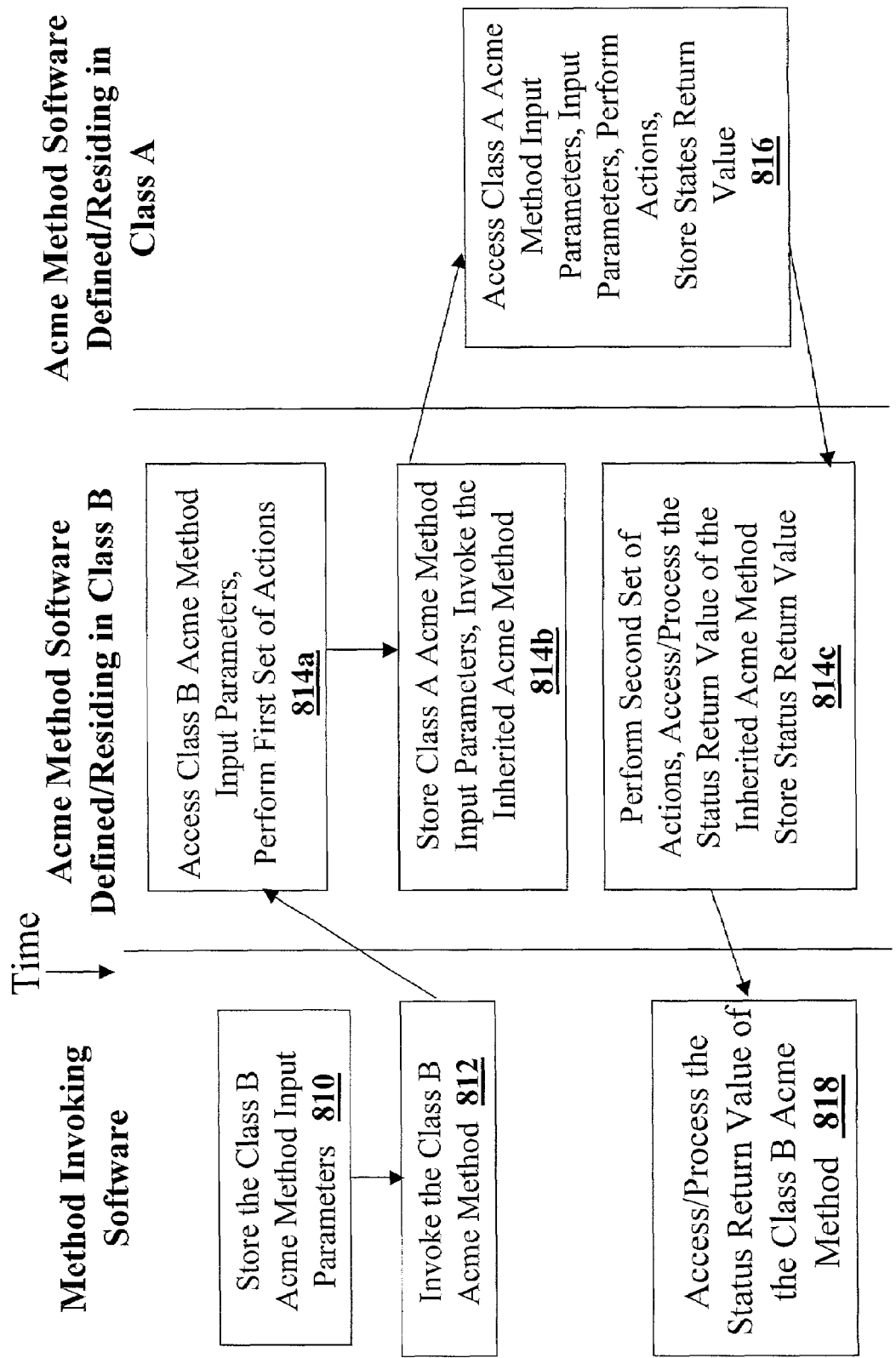
FIG. 8  Partially Overridden Method Invocation

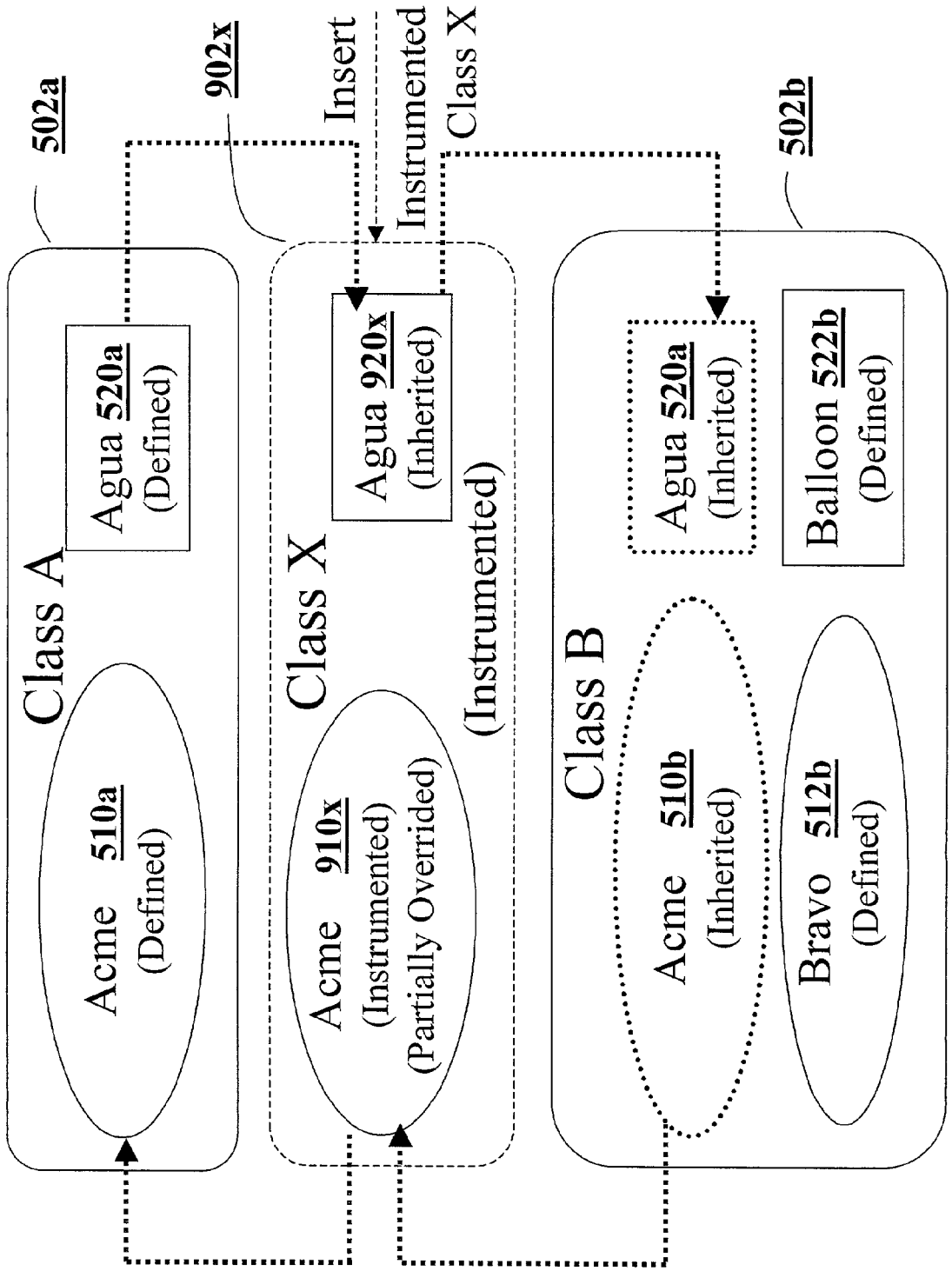
FIG. 9  Class Interceptor Instrumentation

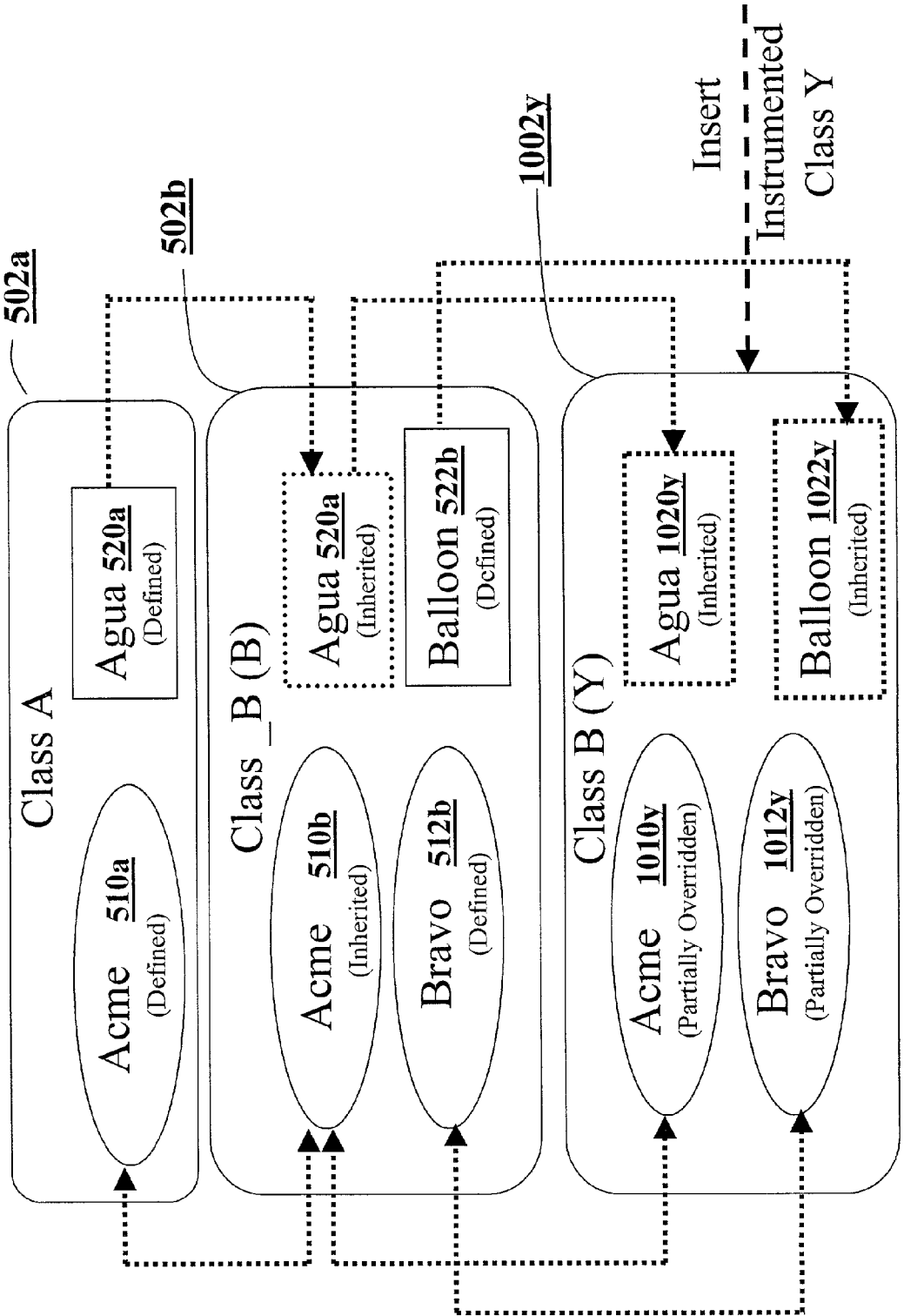
FIG. 10  Class Doppelganger Instrumentation

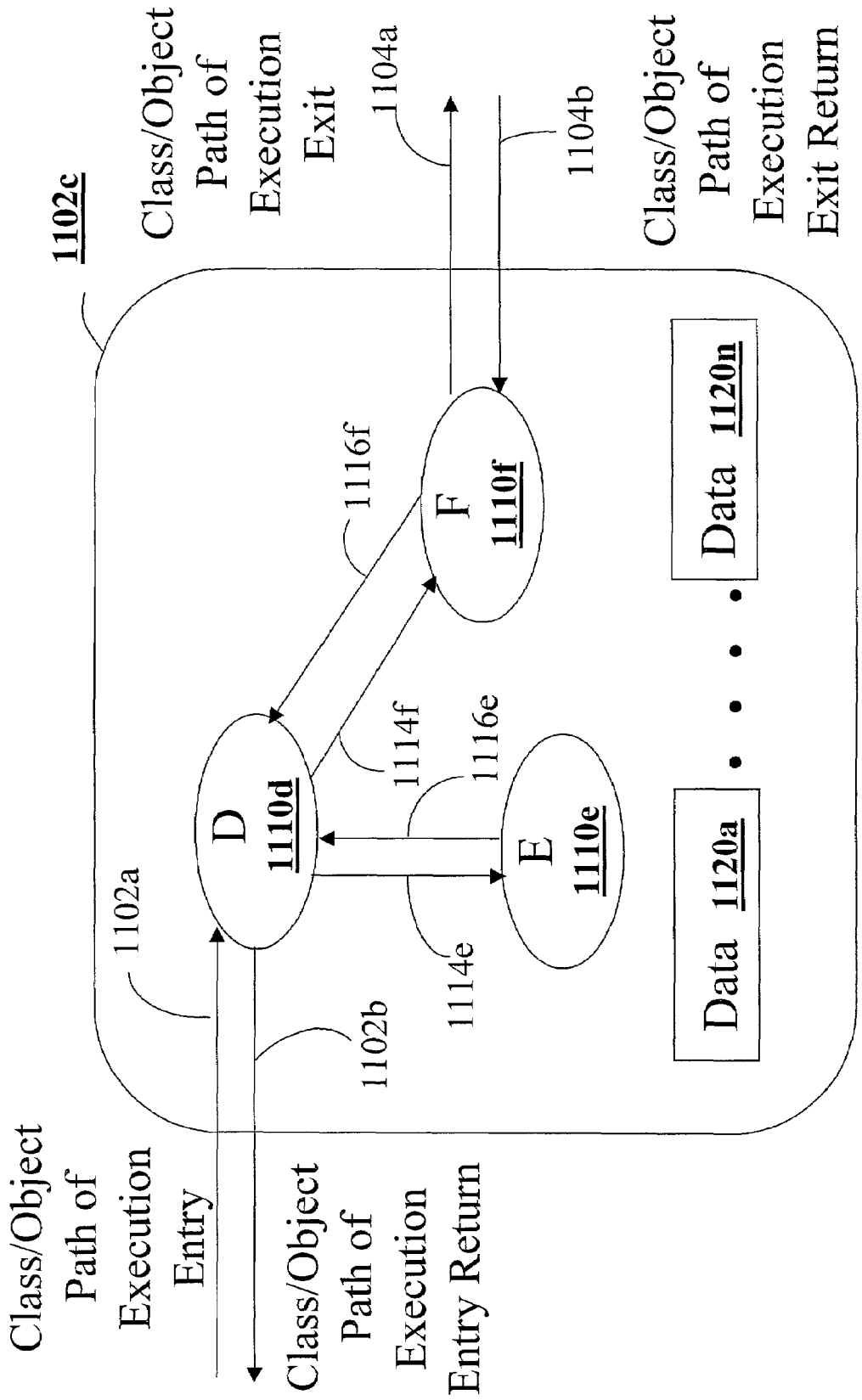
FIG. 11  Class C Internal Components

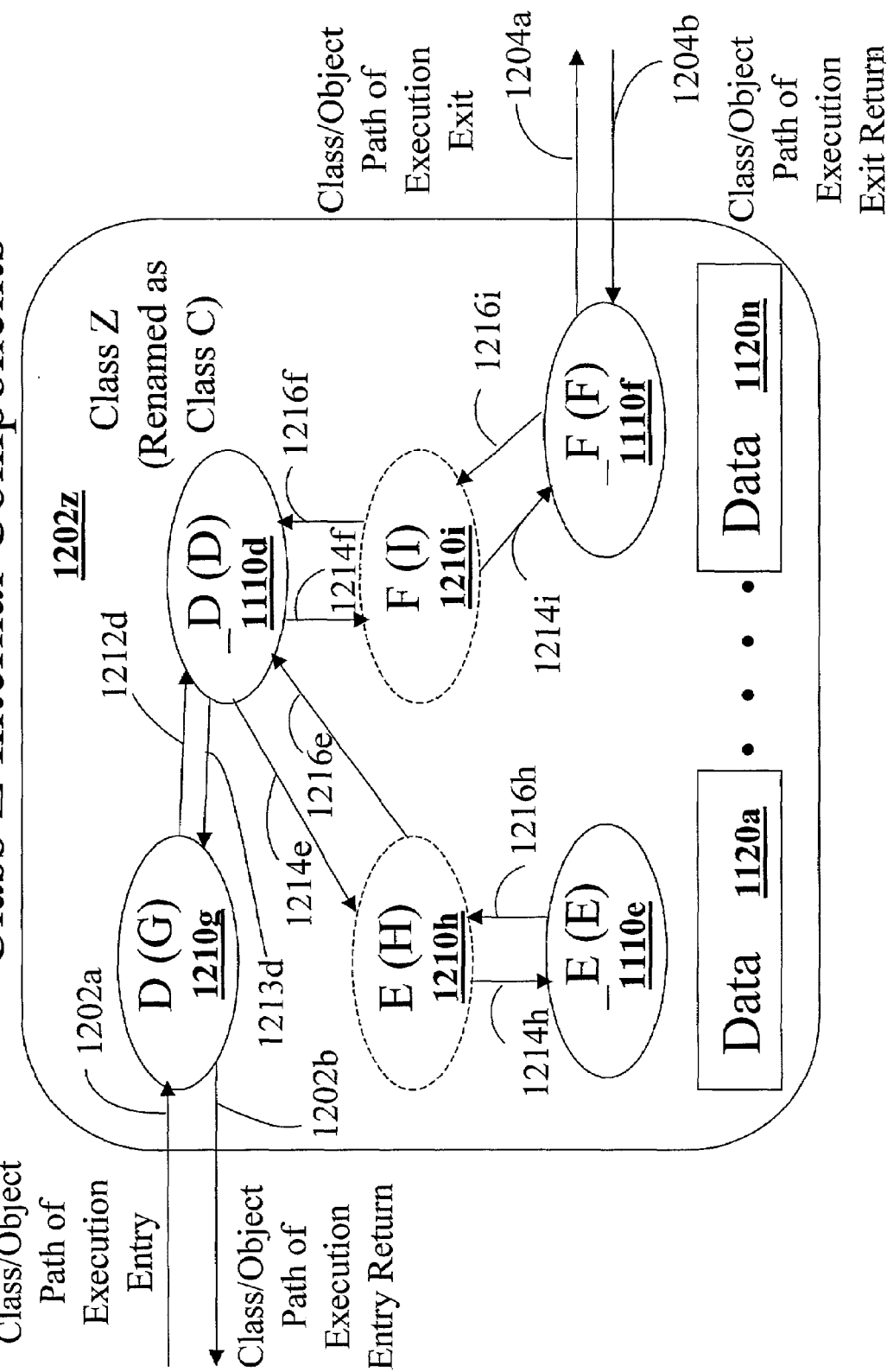
FIG. 12   Method Hijacking Instrumentation Class Z Internal Components

SOFTWARE INSTRUMENTATION METHOD AND APPARATUS

CROSS REFERENCE TO RELATED CASE

This application claims the benefits of U.S. Provisional Patent Application Ser. No. 60/243,087 filed Oct. 25, 2000, the entirety of which is hereby incorporated by reference.

TECHNICAL FIELD

The invention relates to software instrumentation methods and a corresponding apparatus, and more particularly to methods and an apparatus for instrumenting object oriented software.

BACKGROUND INFORMATION

As computer software and the systems that run software increase in complexity, traditional techniques of monitoring or even understanding performance become inadequate. Engineers face an ever more difficult environment in which to diagnose problems, improve efficiency or correct errors. Present-day software frequently presents a combination of real-time constraints and limited access to code and data; it is no longer practical to isolate and execute small segments of code in order to detect and fix bugs.

Accordingly, experienced engineers have developed techniques for "instrumenting" complex systems to facilitate testing, comprehension and monitoring of operation. Instrumented software contains code that allows the engineer to see (e.g., by means of a display) critical aspects of software or system performance even as the system is running. For example, the instrumentation may display various graphical images, such as meters or scales that indicate the efficiency or quality of important performance parameters, offering insight into the sources of problems and possible solutions.

Software instrumentation techniques, whether applied to object oriented or conventional software, typically require access and modification to the source code and executable files. A non-developer of software, such as a purchaser or user of software (and especially of commercially developed software), does not typically have access to the source code files or other instrumentation tools effective for monitoring the software. The user may have access to parameter configuration files that affect and adjust the inner workings of the software. But in many cases the user does not understand enough about the inner workings of the software to make informed changes to the configuration files. Often, the user does not know whether configuration changes are even appropriate to address particular performance or behavioral problems.

The software developer may be unwilling or unable to provide attention to the concerns of the user. As a result, the user (and even technical specialists hired by the user) is typically unable to identify and measure the inner workings of the software to make informed decisions concerning appropriate remedies—e.g., whether reconfiguration or software modification is the correct solution to particular performance or behavioral problems. To address such software performance and behavioral problems, there is a need for tools that better enable the non-developers of software to identify and measure the performance and behavior of the inner workings of the software.

SUMMARY OF THE INVENTION

The invention provides methods and an apparatus for instrumenting object oriented software. The instrumentation techniques of the present invention do not require access to existing source code or modification to existing source code or executable files, nor do these methods require modification to any existing object resident instructions. In the preferred embodiment, these techniques apply to "virtual machine" executable software and the apparatus is implemented as a modified and enhanced virtual machine.

In one embodiment, the invention creates an instrumented class which is designed to exploit pre-existing class inheritance relationships between a class whose behavior is to be monitored, referred to as a target class, and the target class's related ancestor classes residing within the software to be instrumented. The instrumented class is inserted in between the target class and its parent class.

In another embodiment, the invention creates an instrumented class and an inheritance relationship between the instrumented class and the target class. The instrumented class is inserted as a child class of the target class.

In another embodiment, the invention creates one or more instrumented class internal components that are incorporated into a copy of the target class. The instrumented class is substituted for the target class. None of the instructions residing within the target class need be modified after instrumentation.

Other features, aspects and advantages will become more apparent from the following description when taken in conjunction with the accompanying drawings.

BRIEF DESCRIPTION OF THE DRAWINGS

The drawings are not necessarily to scale, the emphasis instead is placed on conveying the concepts of the invention:

FIG. 1C is a diagram illustrating the basic operation of the configuration file editor.

FIG. 6 is a diagram illustrating the programming steps performed when invoking a fully inherited method.

FIG. 7 is a diagram illustrating the programming steps performed when invoking a fully overridden method.

FIG. 8 is a diagram illustrating the programming steps performed when invoking a partially inherited and overridden method.

FIG. 9 is a diagram illustrating the class interceptor software instrumentation technique using an instrumented class X also illustrated in FIG. 1A.

FIG. 10 is a diagram illustrating the class doppelganger (CD) software instrumentation technique using an instrumented class Y also illustrated in FIG. 1A.

FIG. 11 is a diagram illustrating the internal components of Class C also illustrated in FIG. 1A.

FIG. 12 is a diagram illustrating the method hijacking software instrumentation technique using an instrumented Class Z also illustrated in FIG. 1A.

DETAILED DESCRIPTION OF THE PREFERRED EMBODIMENT

Figure 1A:
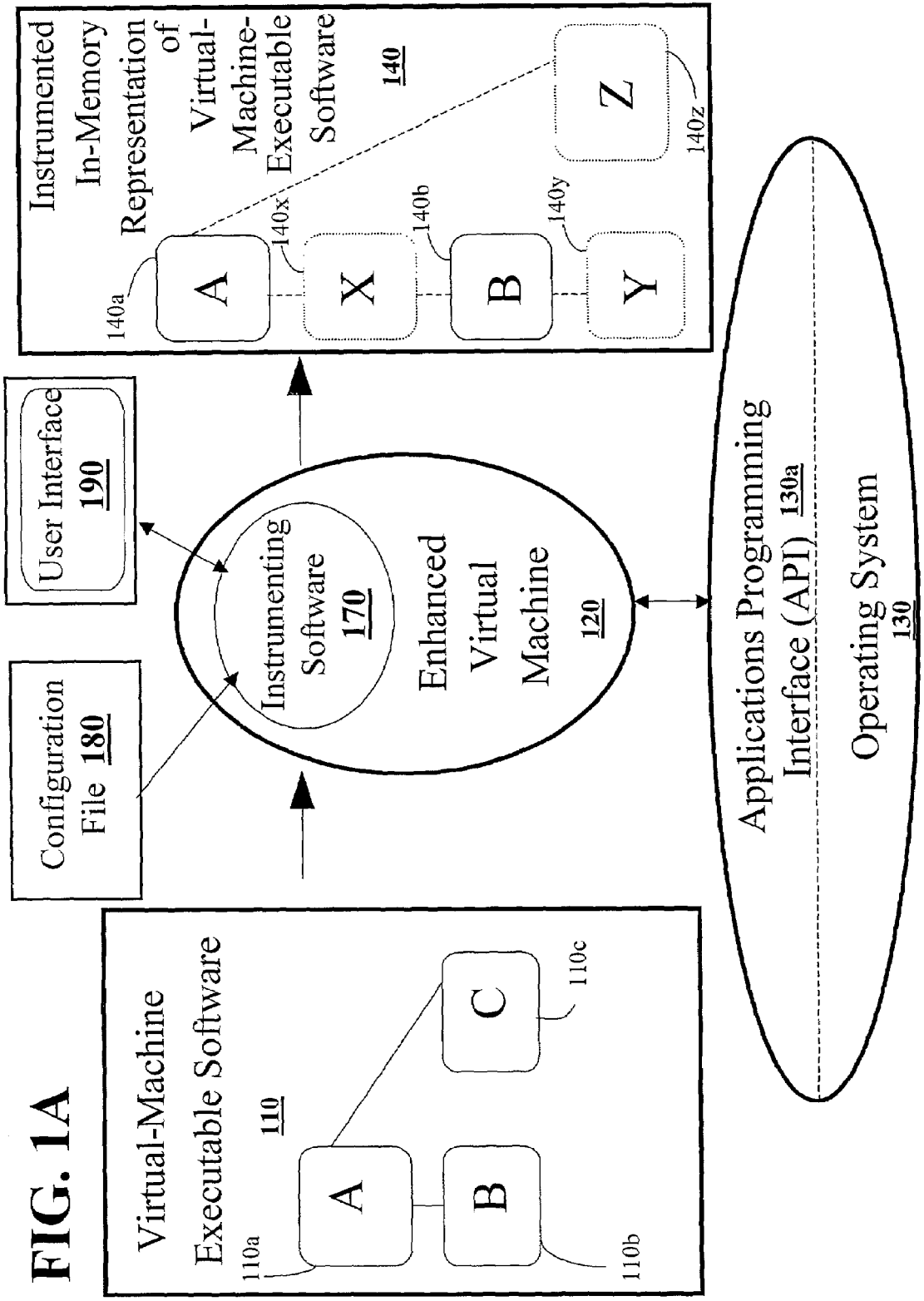
FIG. 1A is a diagram illustrating the basic method and apparatus for instrumenting object-oriented, virtual-machine-executable software.

Refer first to FIG. 1A, which illustrates the basic approach of the invention toward instrumenting object-oriented, virtual-machine-executable software. As used herein, the term "object oriented" means software whose structure includes one or more software objects. A software object is a portion of software within which related instructions and data reside. A software object encapsulates or restricts access to its resident instructions and data from software residing outside of the software object. The term "virtual-machine" refers to a software program that reads and processes specialized programming instructions that are not directly executed by the CPU. Such specialized instructions are said to be "virtual machine instructions" that are "targeted for" and "interpreted by" the virtual machine as opposed to being "compiled for" the CPU. The virtual machine causes the CPU to execute one or more equivalent CPU instructions in response to interpreting and executing a virtual machine instruction.

As shown in FIG. 1A, object-oriented, virtual-machine-executable software 110, stored inside one or more files, is read and processed by a virtual machine 120 that has been enhanced as described herein. This occurs in the same manner as would be the case using a conventional virtual machine, such as the JAVA™ (Java) virtual machine or the Common Language Runtime. The Java virtual machine is manufactured by SUN Microsystems Inc. The Common Language Runtime is manufactured by the Microsoft Corp.

The enhanced virtual machine 120 is modified and adapted to instrument virtual-machine-executable software containing software objects. The enhanced virtual machine 120 inter-operates with an operating system 130 through its applications programming interface 130a to create an instrumented in-memory representation 140 of the object-oriented, virtual-machine-executable software 110. The in-memory representation 140 is enhanced with instrumentation that selectively monitors the behavior of objects residing inside the executing software 140.

The operation of the enhanced virtual machine 120 can be interrupted and optionally suspended for an indefinite period of time and later resumed during the class loading and linking phases of the virtual machine executable software 110. In one embodiment, the instrumenting software 170 can interrupt the operation of the virtual machine 120, execute particular instrumenting actions and then resume the operation of the virtual machine 120. Or in another embodiment, the instrumenting software 170 can interrupt and suspend the operation of the virtual machine 120 indefinitely in order to execute user interface functionality 190 that enables the software 110 to be instrumented under the direction of user entered commands. During this time of suspension, the operation of the virtual machine 120 can be un-suspended and resume execution as directed by the entry of a user entered command via the user interface 190.

A software object residing within virtual machine executable software 110, is represented by a set of memory locations within the software 110 that collectively contain instruction, data and other software object related information. This set of memory locations is typically organized into program structures that are recognizable to the virtual machine 120 while constructing the in-memory representation of the virtual machine executable software 110.

The instrumenting software 170 can perform software instrumentation by modifying the in-memory representation of one or more portions of the software 110, including the representation of one or more software objects via pre-programmed or user entered commands. These commands perform memory operations that can address existing program memory, allocate additional program memory, and that can modify the in-memory representation of the software 110 (not shown) by adding, inserting and deleting one or more memory locations as members of a set of memory locations that represent a software object or its software object related program structures.

Furthermore, these commands can read, copy, write or modify the information content of one or more of these memory locations as members of the set of memory locations that represent a software object or its related program structures. The software 140, representing a modified version of the in-memory representation of the software 10 for the purpose of instrumentation, can then be linked and executed by the virtual machine 120 in the same manner as an unmodified and linked in-memory representation (not shown) of the software 110. The disclosed instrumentation techniques are designed to circumvent modification to any existing sequences of program instructions, whether those instructions are targeted for a virtual machine or a CPU.

In one embodiment, the Java Virtual Machine Profiler Interface (JVMPI), provided by the Java virtual machine, provides for the implementation of event trapping or interrupt handling procedures that execute upon the occurrence of various events associated with the operation of the Java virtual machine 120. These trap or interrupt generating events include the loading or linking of particular portions of software, such as executable files 110 that store the definitions of particular classes. The JVMPI also provides an applications program interface (API) that enables instrumenting software 170 that can be resident (as shown) inside the virtual machine program 120, to execute from the event trapping or interrupting procedures triggered via the JVMPI. Optionally, the instrumenting software 170 can be implemented as a separate process that communicates with the virtual machine 120 via an inter-process communications mechanism provided by the operating system 130 and potentially other network communications functionality (not shown).

In another embodiment, the instrumenting software 170 can read a configuration file 180 containing directives that specify to the instrumenting software 170 upon what event during the operation of the virtual machine 120 is the virtual machine 120 to be interrupted or suspended. Furthermore these directives can specify where in terms of memory locations, and how in terms of memory modifications, the in-memory representation of the software 110 is to be modified to effect instrumentation. Like pre-programmed and user entered commands, these directives can specify the performance of the same types of memory operations upon the in-memory representation of the software 110 (not shown). The user can add, delete, modify and save these directives into the configuration file 180 before executing the instrumenting software 170 associated with the enhanced virtual machine 120.

For the above described embodiments, the instrumentation is added to the in-memory representation of portions of software 110, after being loaded and before being linked in memory by the virtual machine 120. All instrumentation is added to each portion of the software 110, such as a software class, before that portion of the software is 110 initially executed by the virtual machine 120.

The Java Virtual Machine Specification (Second Edition) is an example of a published document that describes the in-memory representation of a Java virtual-machine-executable program. For example, this document describes how each class is represented by an instance or copy of a ClassFile data structure. The ClassFile structure includes a plurality of method_info structures representing class-associated methods. The ClassFile structure also includes a plurality of field_info structures representing class-associated data and the attribute_info structure representing other class related attributes.

The object-oriented, virtual-machine-executable software 110 is depicted as including three software classes A, B and C, indicated, respectively, at 110a, 110b, 110c. Each of these classes define objects residing within the software 110. It should be noted that the object oriented software 110 need not be constructed exclusively from objects and may include portions that are not encapsulated within objects. Class 110a is depicted as being a parent of classes 110b and 110c.

The instrumented in-memory executable software representation 140 is depicted as including software classes X, Y and Z, indicated, respectively, at 140x, 140y, 140z in addition to classes A and B, now indicated, respectively, at 140a, 140b. The classes 140x, 140y and 140z each represent instrumented classes that monitor the behavior of the classes A, B and C. Each class X 140x, Y 140y and Z 140z uses different instrumentation techniques. None of these techniques modifies pre-existing sequences of class resident instructions.

As shown in FIG. 1A, the instrumented class 140x is inserted as a child of class 140a and as a parent of class 140b. Class 140x is designed to monitor the behavior of class 140b by exploiting the pre-existing inheritance relationship between child class B and its ancestor classes including its parent class A. Class 140x is positioned to intercept and monitor the paths of execution traveling through the class B components inherited from ancestor classes including class A.

The instrumented class 140y is inserted as a child of class 140b. Class 140y is designed to monitor the behavior of class 140b by creating and exploiting an inheritance relationship between it and class 140b. Class 140y is positioned to intercept and monitor the paths of execution traveling into class B components regardless of whether these components are defined, overridden or inherited by class B.

The instrumented class Z is substituted for class C. Class 140z is a modified copy of class C designed to monitor the behavior of the internal components residing within the un-instrumented class C. Class 140z adds and positions instrumented internal components to intercept paths of execution traveling between the pre-existing class C internal components. All modifications to the class Z may be performed without modifying sequences of pre-existing class C and component resident instructions. As will be explained, all of the disclosed instrumentation techniques may operate to minimize intrusion into the monitored software 110 and to avoid modifying any sequences of pre-existing class resident instructions or bytecode sequences.

Figure 1B:
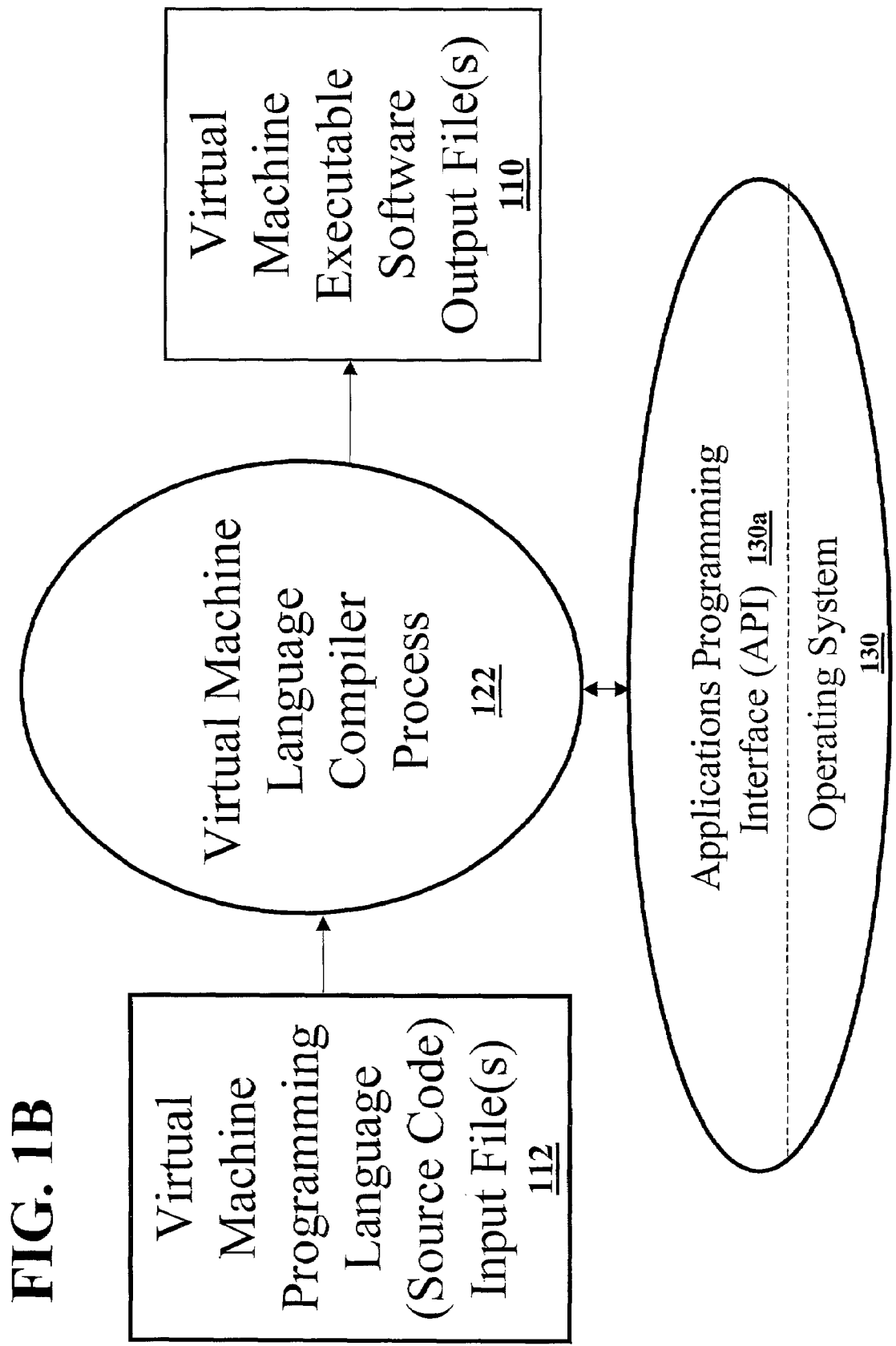
FIG. 1B is a diagram illustrating the basic operation of a virtual machine language compiler.

FIG. 1B illustrates the basic operation of a virtual machine language compiler process. The virtual machine language compiler 122 operates much in the same manner as an ordinary compiler, referred to as a native or machine compiler. An object-oriented program, written in a virtual machine programming language such as Java is referred to as source code and is stored inside one or more input files 112. These files 112 are read and processed by a virtual-machine-language compiler 122 to produce virtual-machine-language executable instructions, collectively referred to as executable software, stored in one or more output files 110. As depicted in FIG. 1A, these output files 110 are processed as input to the enhanced virtual machine 120 to create an instrumented in-memory representation 140 of the software contained in these files 110.

The virtual-machine-language compiler process 122 typically translates high-level, human-readable programming commands into virtual machine language "instructions" or "opcodes", collectively referred to as "bytecode", that is stored in the output files 110. Virtual-machine instructions are targeted for the virtual machine 120 and are processed by the virtual machine 120 in the same manner as the CPU 250 processes instructions, referred to as native or machine instructions targeted for it. Unlike CPU machine instructions, virtual-machine instructions or bytecode must be processed by the virtual machine 120 and cannot be processed directly by the CPU 250. Consequently, virtual-machine instructions (bytecode) are said to be "interpreted" by the virtual-machine software 120 as opposed to CPU instructions that are compiled for and executed by the CPU 250.

Typically, all program instructions, whether virtual or CPU, are compiled and linked together before the execution of any one compiled and linked instruction. Some virtual machines 120 have a "just in time" (JIT) compilation capability providing a mechanism for a portion of the virtual program instructions to be compiled and executed as native machine code instructions. The disclosed software instrumentation techniques apply equally well to JIT compilation as with traditional compiling. As with normal compilation, the techniques are applied to each portion of software before that portion of software is linked into the remaining program.

As shown in FIG. 1C, the configuration file 180 can be modified or edited via configuration file editor software 124, residing separate from the virtual machine 120, that provides a user interface 194 for the user to enter commands that specify which portions of the software 110 are to be instrumented and how they are to be instrumented. In one embodiment, the configuration file stores ASCII data representing these commands while the editor 194 is an ASCII file editor program available for purchase with most any operating system. These commands can act as or be translated into directives that are read and processed by the instrumenting software 170. In one embodiment, these instrumenting commands could be expressed with the Extended Markup Language (XML).

In another embodiment, the configuration file 180 and user interface functionality 190 as shown in FIG. 1A can interoperate with each other. The configuration file 180 can specify particular events occurring during the operation of the virtual-machine that will cause the operation of the virtual machine to suspend and invoke the user interface 190. For example, the configuration file can contain directives that specify class attributes and values describing one or more classes to be instrumented. Class attributes, which are associated with one or more classes, can for example, include one or more of the following: class name; parent class name also known as the super class name; interface names; method names including inherited, overridden, and defined methods regardless of visibility; and field names including constant, class, and object fields regardless of visibility.

A class that possesses a set of class attribute names and values consistent with a set of class attributes and values specified in the configuration file 180, is referred to as a target class. The instrumenting software 170 under the direction of the configuration file 180, can interrupt and suspend the operation of the virtual machine 120 after loading and before linking an in-memory representation of one or more target classes possessing attribute names and values as specified in the configuration file 180. The instrumenting software can then execute user interface functionality 190 that enables a user to read, inspect and modify for the purpose of instrumentation, the one or more in-memory program structures constituting or associated with the one or more classes. Furthermore, the instrumenting software 170, or the user may exercise the JVMPI to pre-load and pre-link target classes or classes related to target classes in a sequence different from what the virtual machine (VM) would otherwise perform.

Figure 2:
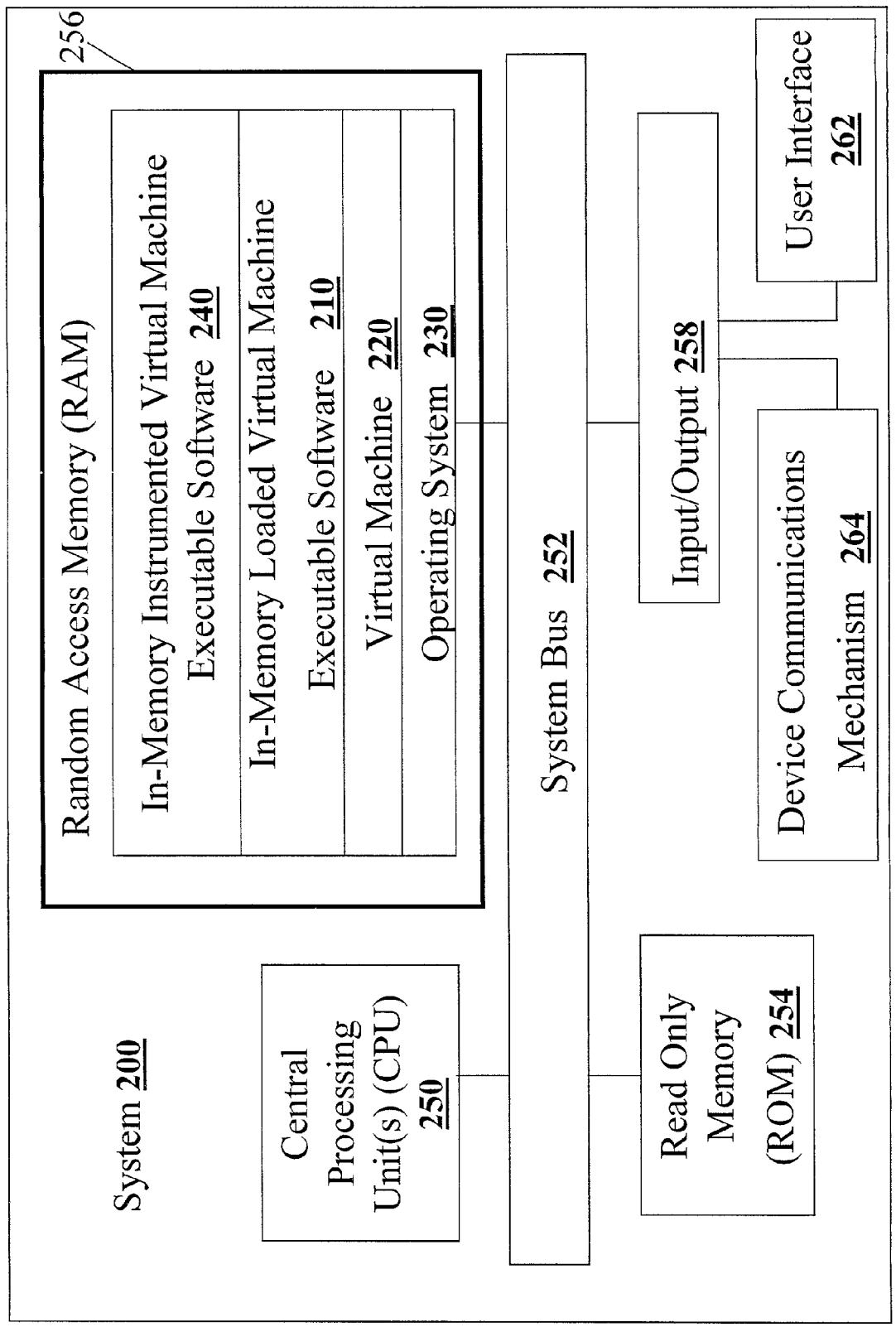
FIG. 2 is a diagram illustrating basic hardware components that support the in-memory representation of software components and instrumented software.

With reference to FIG. 2, the basic hardware components supporting the invention include one or more central processing unit(s) (CPU) 250, a system bus 252 over which the various components communicate, a read-only memory (ROM) 254, a read-write or "random access" memory (RAM) 256 and an input/output (I/O) mechanism 258. CPU 250 and memory 254 and 256 are directly connected to the system bus 252. CPU instruction information, also referred to as firmware or software, can be stored inside the ROM 254 and the RAM 256, respectively. The CPU 250 accesses or fetches the contents of either type of memory 254 or 256 through the system bus 252.

ROM 254 is typically of the non-volatile type, meaning that it requires no constant supply of power to preserve the information content of its memory for later use. This type of memory typically stores "bootstrap" software, referred to as "firmware," which is the first type of software to execute upon powering the hardware. RAM 256 is typically of the volatile type, meaning that it requires a constant power to preserve the information content of its memory for later use. This memory typically stores the bulk of the software and data directly accessible to CPU 250.

The CPU 250 controls the various hardware components via instructions stored in memory 254 and 256. The system 200 communicates with a user and other outside hardware via at least one input/output port 258 and a user interface hardware 262 that can include a display screen, keyboard and pointing device. The input/output port 258 can also communicate with other devices, including a disk drive (not shown) or other mass storage device, via a device communications mechanism 264.

Figure 3:
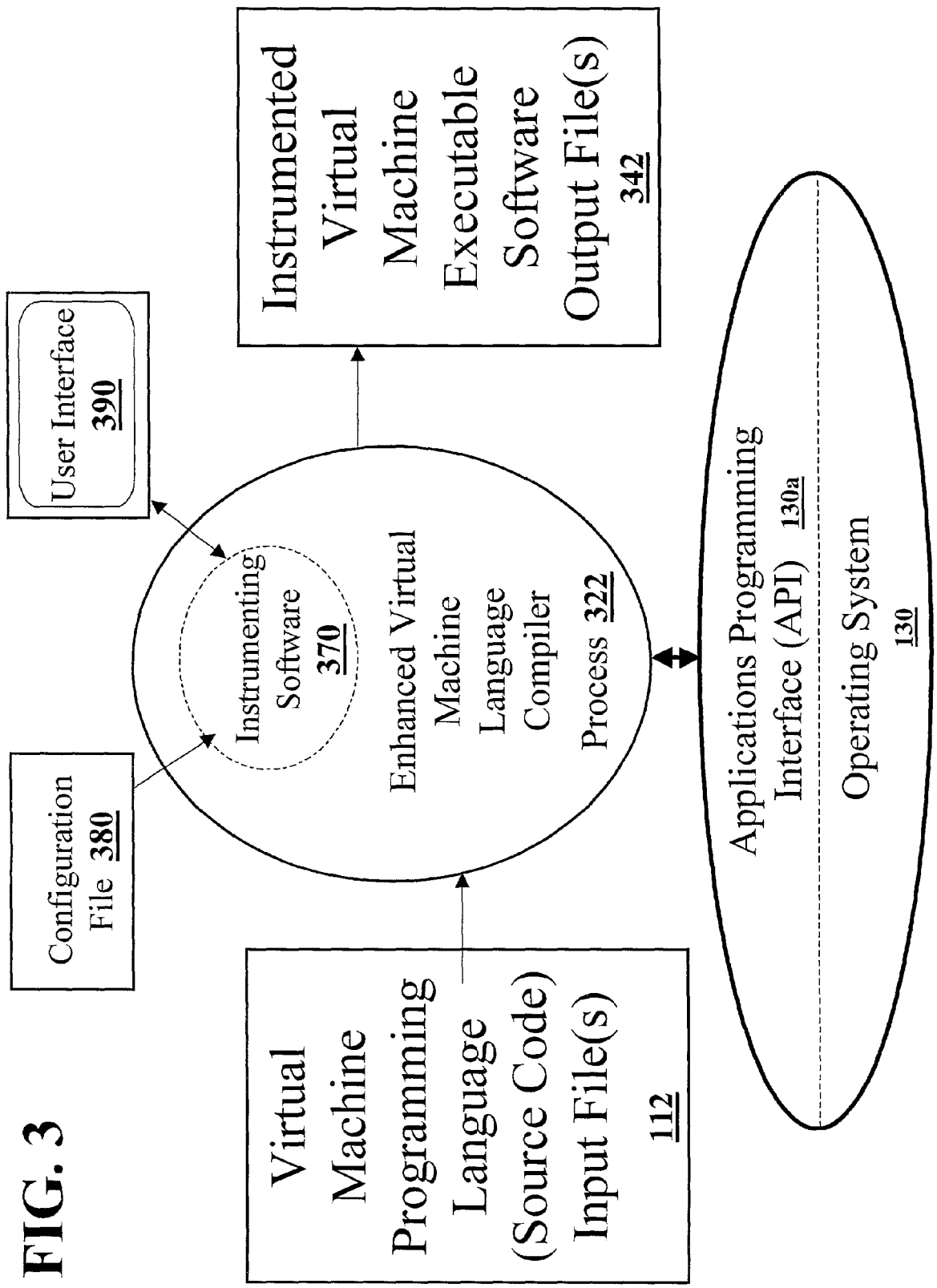
FIG. 3 is a diagram illustrating the basic operation of the enhanced virtual machine language compiler.

In another embodiment, as illustrated in FIG. 3, virtual-machine software, stored as source code in one or more files 112, can be read, processed and instrumented by instrumenting software 370 residing separate from the virtual machine 120. This instrumenting software 370 can inter-operate with a compiler 322, for example. The configuration file 380 and user interface 390 can function in the same manner as described for configuration file 180 and user interface 190 in FIG. 1A.

Instrumenting software converts the input files 112 into an in-memory representation and adds instrumentation to the in-memory representation in the same manner as performed by the software 170 executed from event trap or interrupt handling procedures of the virtual machine 120. The software 370 then translates and writes the instrumented in-memory representation of the software (not shown) into newly created and instrumented virtual-machine-executable files 342. These pre-instrumented executable files 342 are then processed by the virtual machine 120 without requiring suspension or interruption for the purposes of instrumentation. This is referred to as source to executable or source to binary software translation for the purpose of instrumentation.

In another embodiment like that shown in FIG. 3, the instrumenting software resides in a process (not shown) that inputs and processes executable software, such as for example virtual-machine executable software 110, converts the input files 110 into an in-memory representation and adds instrumentation to the in-memory representation in the same manner as performed by the software 170 residing inside the virtual machine 120 and then translates and outputs the instrumented in-memory representation of the software (not shown) into newly created and instrumented virtual-machine-executable files 342, as shown in FIG. 3. This embodiment is referred to as executable to executable or binary to binary software translation for the purpose of instrumentation.

Figure 4:
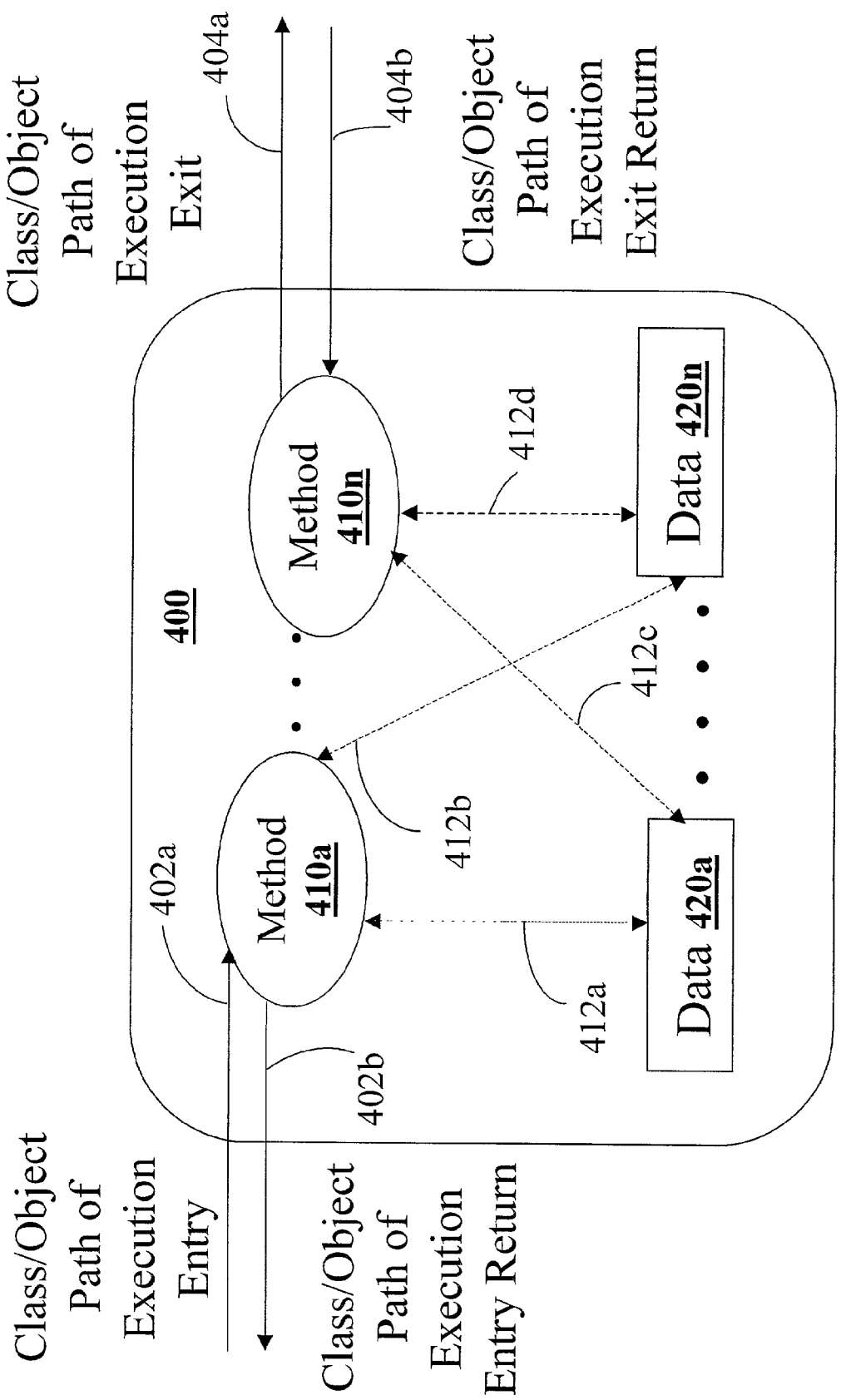
FIG. 4 is a diagram illustrating the internal components of a class and its related objects.

FIG. 4 illustrates the internal components of a class and its related objects. A class 400 is a structural specification used to construct one or more software objects residing inside an executable software program. Each constructed object is referred to as an instance of a particular class 400. Class-constructed software objects will be referred to as class-generated or related objects, or simply as class objects.

A class 400 is typically expressed in terms of what is classified as a high level or a human-readable object oriented programming language, for example the Java, C++ or Smalltalk programming languages. There is no requirement to implement classes via a high level, human readable or object oriented programming language. For example, some versions of the object oriented C++ programming language are translated into what is classified as the non-object oriented C programming language before being translated into what is classified as the "semi-human readable" assembler language and eventually translated into what is classified as "non-human readable" machine language instructions, including virtual machine instructions. The C programming language, assembler language and the machine language versions of the software all contain and express classes despite not being classified as high level, human readable and object oriented.

In the typical scenario as illustrated in FIG. 1B, instructions expressed in the human-readable programming language, i.e., source code 112, are compiled by the programming language compiler 122 into a machine readable representation (machine language instructions) 110 that are targeted for either a native or virtual machine, for use in an executable software program. The compiled and machine readable class representation 110 is utilized by the executable software program to create one or more copies of structured information in program memory, each copy constituting a software object or "instance" of that class 400.

A class 400 contains a series of methods 410a–410n referred to as class methods, and data 420a–420n referred to as class data. Class methods 410a–410n are named procedures or sequences of instructions (bytecode) that specify sequences of actions conditionally performed by class generated objects. Class data 420a–420n stores information accessed and processed by the class methods 410a–410n. For example, class methods can be designed to initialize, read, write or modify any or all class. All paths of execution within a class-generated object, including data access paths of execution 412a, 412b, 412c, and 412d travel through the methods of the class generated object. Class methods 410a–410n collectively contain all the instructions residing within any associated class-generated object. The flow of execution 402a enters the class 400 by entering method 410a and returns to external software 402b by exiting the method 410a. The flow of execution exits the class 400 via 404a and returns to the class 400 via 404b.

A method 410a–410n is characterized by its input and output programming interfaces, also referred to as its invocation and status return interfaces. Each method 410a–410n is designed to be invoked with an ordered set of data types and associated values referred to as invocation parameters. The invocation parameter values are designed to affect the execution of the invoked method 410a–410n. Each method 410a–410n is designed to return a data type with an associated value indicating the status result of the execution of that method 410a–410n. This returned data type is referred to as the output or status return interface of the method 410a–410n.

Class data 420a–420n is specified by individual units of named data, each classified by a data type. Class data 420a–420n collectively identifies and includes all execution-modifiable information associated with each class-generated object. The data values stored within the class data indicate the state or execution status of any object. The method name in combination with the input and output interface is collectively referred to as the "signature" of the method.

The value of class data 420a–420n which can be initialized, read, written and modified by instructions contained within class methods 410a–410n is subject to change during the execution of a program. As a result, each class-generated object has its own private copy of all class specified data 420a–420n so that only the execution of the class methods 410a–410n related to that particular class-generated object can affect the value of its data 420a–420n.

Conversely, the value of method instructions are constant and not subject to change during the execution of a program. For memory storage efficiency, only one copy of method instructions for each method 410a–410n for each class is typically stored for access and execution by each and every class-generated object associated with that class 400.

For further efficiency, different classes can share commonly designed methods and data. The structure of each class 400 can be defined relative to the defined structure of other classes that designate appropriate method 410a–410n and data components 420a–420n. For example, suppose that a class A is designed to contain a method named Acme and a data value of a certain type named Agua, and each method or data component is designed for a particular purpose. Suppose further that a class B is also designed to contain the same type of method as Acme and the same type of data as Agua, each designed for the same purposes as the components of class A. Rather than redundantly specify a method like Acme and data like Agua, class B can reference, access and adopt the definition of Acme and Agua residing in class A for its own use. Allowing such class component referencing and access between different classes enables sharing and efficient use of class components. This class inheritance mechanism is used by many object oriented languages, such as C++ and Java, for referencing and sharing components between classes.

Figure 5:
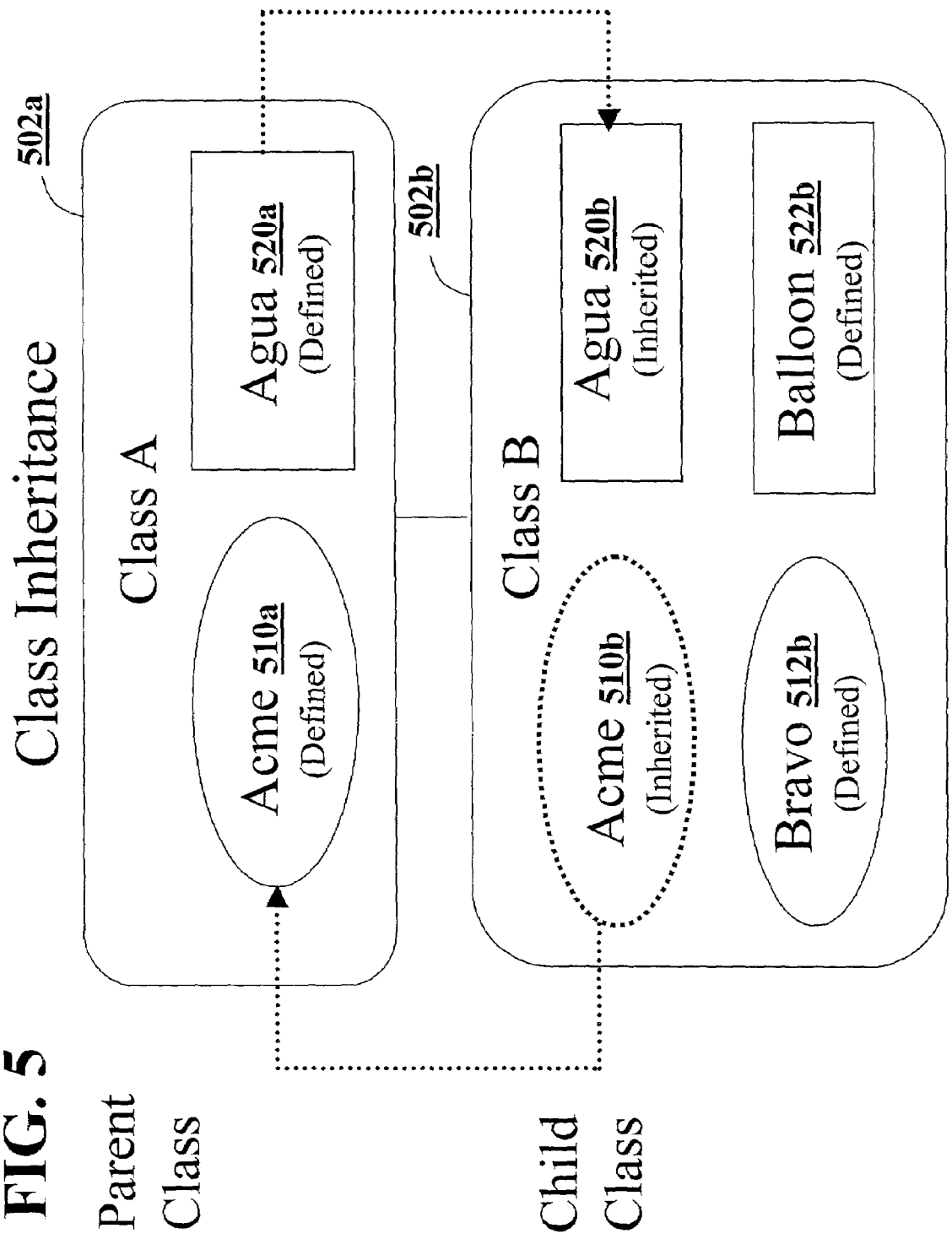
FIG. 5 is a diagram illustrating a class inheritance relationship between a parent class and a child class.

FIG. 5 illustrates an inheritance or sharing relationship between a parent class (class A) 502a and a child class (class B) 502b. Class 502a contains and defines a method 510a named Acme and a data type 520a named Agua. Class 502b is defined as a child of class 502a. Consequently class 502a is a parent of class 502b.

Class 502b contains a method 512b named Bravo and a data type 522b named Balloon. As a result of class inheritance, the child class 502b implicitly inherits or shares the methods and data of its parent class 502a. Consequently, class 502b implicitly and effectively contains the Acme method 510b that is defined in its parent class 502a, and a separate private copy of the Agua data type 520b. In reality class 502a physically retains the only copy the Acme method 510a, but invocation of this method 510a by class B (502b) will cause its execution to process only the Class B data 520b, not the Class A data 520a.

When the Acme method is invoked by class 510a, only the Agua data value 520a is read or written (modified) by the method 510a. But when the Acme method is invoked by class 510b, only the Agua data value 520b is read or written (modified) by the method 510b (which, again, is actually the class A Acme method 510a physically stored in association with class 502a). Any software instruction that invokes class B's Acme method 510b will actually invoke class A's Acme method 510a applied to class B's private data 520b. The virtual machine language compiler 122, in conjunction with the virtual machine 120, can implement this sharing technique.

The above described class A parent and class B child inheritance relationship forms a "class hierarchy" containing two levels. Actually, the class A and class B relationship forms a two-class "branch" hierarchy. A class hierarchy can be structured like a inverted "tree" that can contain many inter-connecting branches and many levels. The trunk of the inverted tree represents the highest ranking class within the hierarchy. The highest ranking classes reside highest or closest to the trunk, while the lowest ranking classes reside lowest or farther from the trunk of this inverted class hierarchy tree. A class located within a class hierarchy does not necessarily have an inheritance relationship with every other class located within the class hierarchy.

"Related classes" are classes whose relative locations within the class hierarchy enable an inheritance relationship between them. The location of a target class within a class hierarchy can be defined as the hierarchically ordered sequence of higher ranked ancestor classes residing above the target class. For example, suppose if class M is a parent of class N, and class N is a parent of class O, and class O is a parent of class P, then the class hierarchy location assigned to class P is defined as "M-N-O". The class P chain of inheritance is defined as "M-N-O-P". Class P is related to class M because there is a contiguous connected chain of parent/child class relationships between class M and P. For the class A-B class hierarchy relationship, the class hierarchy location assigned to class B is defined as "A" and the class B chain of inheritance would be defined as "A-B".

With respect to a particular class, lower ranked related classes are called descendant classes. For example, classes N, O and P are descendant classes of class M. With respect to a particular class, higher ranked related classes are called ancestor classes. In this example, classes M, N and O are ancestor classes of P. A parent class and its associated child classes are classified as being "adjacent" to each other. For example, classes N and O are adjacent, but classes N and P are not adjacent to each other. Class N is adjacent to and above class O while class O is adjacent to and below class N within the class hierarchy. Generally, an inheritance relationship exists between a target class and an ancestor class.

With reference to FIGS. 1B and 5, the virtual machine language compiler 122 typically implements inheritance sharing in the following manner. The virtual machine compiler 122 parses and processes source code 112 to generate one or more virtual machine-executable files 110. While parsing and processing, the virtual machine compiler 122 recognizes the class A-defined Acme method 510a and reserves a program location to it. The compiler 122 also recognizes that class B (502b), classified as a child class, shares an Acme method through class inheritance. The compiler 122 also recognizes the absence of class B resident instructions defined for its Acme method. This classifies the Class B Acme method as being fully inherited.

The absence of all such instructions indicates to the compiler that the class B Acme instructions must be accessed and executed through the inheritance mechanism. The compiler 122 does not necessarily "know" that the inherited method 510b is actually the class A Acme method 510a. Instead the compiler 122 creates a symbolic method link from the class 510b to the nearest inherited Acme method within the class hierarchy, wherever it may reside. The compiler 122 does not necessarily recognize where in the class inheritance hierarchy the nearest inherited Acme method resides. This symbolic link is stored inside the compiled virtual machine executable software file(s) 110.

Upon loading and linking of the executable software files 110, the virtual machine interpreter 120 loads and links class 502a, and assigns memory to store the Acme method component 510a of class 502a at a particular program location associated with class 502a. When the virtual machine loads and links class 502b via the virtual machine loader and linker 120, it identifies the symbolic method link from the inherited Acme method 510b to the nearest inheritable Acme method, searches higher levels of the class hierarchy for the nearest related class defining the inheritable Acme method to be inherited as 510b, and substitutes the symbolic method link with a real method link from the inherited Acme method 510b to the inheritable method 510a stored at its particular program location as defined in Class A 502a. Like all methods, the Class A Acme method 510a typically contains a sequence of instructions defining its behavior when executed.

A reading of the source code invoking the Acme method 510b would falsely indicate or imply that class 502b physically contains and defines its associated Acme method 510b. As explained above, however, the virtual machine language compiler 122 in co-operation with the virtual machine linker 120 create the illusion (from the perspective of the source code) that the class B-invoked Acme method 510b resides in class B. But in fact, the class B Acme method 510b is a symbolic invocation of an ancestor class method stored in the virtual machine language compiled and executable code 110. The Class B Acme method 510b inherited in this fashion is referred to as a "virtual method", regardless of whether the type of instructions it contains is targeted for the a virtual machine or CPU. This symbolic invocation is resolved during the pre-execution linking stage of the virtual machine 120, also referred to as "late binding". As will be explained, methods of the invention exploit the late binding functionality of the virtual machine 120.

FIG. 6 depicts the path of execution when invoking a fully inherited method. For this example, software compiled from an object oriented programming language, residing outside of classes A and B, invokes the class B Acme method 510b. This software has no knowledge of how the method 510b has been implemented. It does not "know," for example whether or from where the method has been fully or partially inherited, or if inherited, whether the method has been fully or partially overridden. Before invoking the method, the software stores the class B Acme method's input parameters (step 610) in a program location accessible to wherever the class B Acme method 510b may reside, such as in globally accessible temporary memory (e.g., the program stack). The software then commands that the class B Acme method be invoked (step 612).

As previously explained, virtual machine language compiler 122 in combination with the virtual machine late binding functionality causes the class A Acme method 510a to be invoked and its instructions to execute in response to an invocation of the Class B Acme method 510b. The method 510a instructions access the stored input parameters, perform one or more actions based upon the values of the input parameters, and store a status return value (step 614) in a program location accessible to the software invoking the method 510b. The software invoking the method 510b then accesses and processes the status return value (step 618) from the program stack stored by the class A Acme method as a result of the class B Acme method invocation.

Note that the method-invoking software performed no actions other than storing the input parameters, invoking the method and accessing the status return value as made accessible by the invoked method. This invoked method is classified as being "fully inherited" because all executed instructions were resident outside of Class B and were accessed and executed through an inheritance mechanism. Alternatively, child class 502b can implement its Acme method 510b by replacing or overriding the inherited Acme method 510a instructions. In this situation, class 502b inherits only the use of the Acme method signature, i.e., the method name and the combination of its input and output interfaces. Method instructions defined by and resident in class 502b for the class B Acme method 510b must execute to be consistent with the inherited class A Acme method signature. Instructions that override an inherited method are physically stored in association with class 502b, the overriding class.

FIG. 7 illustrates the path of execution when invoking a fully overridden method. For example, suppose that software compiled from an object oriented programming language, residing outside of classes A and B, invokes the class B Acme method 510b. This software has no knowledge of how the method 510b has been implemented, e.g., whether or from where the method has been fully or partially inherited, or if inherited, whether the method has been fully or partially overridden. Before invoking the method, the software stores the class B Acme method's input parameters (step 710) in a program location accessible to wherever the class B Acme method 510b may reside, such as the program stack. The software then commands that the class B Acme method be invoked (step 712).

When compiling the source code 112, virtual machine language compiler 122 recognizes the presence of Acme method instructions residing inside class B and recognizes that none of these instructions invoke any inheritable version of the Acme method. Consequently, the virtual machine language compiler 122 determines that the method 510b inherited from class A (see FIG. 5) was fully overridden or fully substituted by the Acme method instructions residing in class 502b. Instead of inserting a symbolic method link from Class B to any inheritable method wherever it may reside in the class hierarchy, the compiler 122 inserts a real method link from any software instructions invoking the Class B Acme method to the method 510b, defined and resident inside class 502b.

Unlike the scenario of FIG. 6, invoking the method 510b does not cause execution of the method 510a instructions. Instead, the overriding class B Acme method instructions execute (step 714) to access the stored input parameters, perform one or more actions based upon the values of the input parameters, and then store a status return value (step 714) in a program location accessible to the software invoking the method 510b. The programming language invoking the class B method 510b then accesses and processes the status return value stored by the method 510b (step 718).

As yet another alternative, the method 510b can be designed to both override and inherit through explicit invocation of the inherited Acme method. In this scenario, the class B Acme method instructions residing in class B are defined and designed to execute before and/or after explicitly invoking the inherited class Acme method, wherever it may reside in the class hierarchy. Here, the overriding class B Acme method 510b contains instructions commanding invocation of the inherited Acme method. These class B Acme method instructions supplement (partially override) the inherited Acme method instructions. The partially overriding method instructions do not include information identifying class 502a or any other class. In this approach, class B is said to partially inherit and override the class A Acme method 510a. Method instructions that override a method, partially or fully, are physically stored and reside in association with class 502b, the class containing the overriding method.

The compiler 122 recognizes the presence of Acme instructions residing inside the class B Acme method and recognizes that these instructions also invoke an inherited version of the Acme method residing somewhere in the class hierarchy. Consequently, the virtual machine language compiler 122 determines that the inherited Acme method, ultimately identified as 510a during the virtual machine linking phase, (see FIG. 5) was partially inherited and overridden or supplemented by Acme method instructions residing in class 502b. The compiler 122 inserts both a real method link from the software invoking the Class B Acme method to the method 510b, defined and resident inside class 502b, and inserts a symbolic link representing the inherited Acme method invocation instruction from method 510b to the inherited Acme method, wherever it may reside in the class hierarchy.

FIG. 8 depicts the programming steps involved in invoking a partially inherited and overridden method. The program code invoking the class B Acme method stores the method's input parameters (step 810) in a program location for access by the Acme method, wherever it may reside inside the software program. The method-invoking software then commands invocation of the class B Acme method (step 812).

As explained above, the virtual machine language compiler 122 previously determined that the class B Acme method 510b inherited from class 502a was overridden, partially or fully, by Acme method instructions resident and defined in class 502b. Nonetheless, it should be understood that the class B Acme method explicitly inherits the class A Acme method by including explicit programming instructions stored inside the class B Acme method, that invoke the inherited Acme method wherever it may reside in the class hierarchy.

Accordingly, instead of the class A method being executed, the overriding class B Acme method instructions execute (step 814a) to access the stored input parameters, execute a first set of zero or more instructions performing actions based upon the values of the input parameters 814a, and explicitly invoke the inherited class A Acme method (step 814b). The class B Acme method inputs its parameters 814a and stores a copy of them 814b for the class A Acme method before invoking the class A Acme method. The inherited class A Acme method 510a performs as described in the discussion of FIG. 6 processing its copy of parameters 816. The overriding class B Acme method then executes a second set of zero or more instructions performing actions based upon the values of the input parameters and the status return value of the inherited class A Acme method 510a, storing a status return value (step 814c) in a program location accessible to the software invoking the class B Acme method 510b. The program code invoking the class B method 510b then accesses and processes the status return value stored by the class B Acme method (step 818).

Whether a particular class's methods are fully inherited, fully overridden or partially inherited and overridden is a factor in determining what instrumentation techniques are appropriate to monitor the behavior of those methods. For example, the monitoring of an inherited method via the class interceptor technique requires a corresponding monitoring method residing in the inheritance hierarchy to be partially overridden. This monitoring method would contain instrumenting instructions executing as part of the first and/or the second set of instructions as described in FIG. 8. Invoking the inherited Acme method between the optional first and second set of instrumenting instructions residing inside the monitoring method, enables the Acme method to function in the same manner as it would without instrumentation software invoking it.

FIG. 9 illustrates a software instrumentation technique herein referred to as the class interceptor (CI). The class interceptor technique enables the execution activity of class objects to be monitored by intercepting and monitoring the path of execution associated with their partially or fully inherited methods. This technique requires no modifications to existing instruction sequences or access to source language code defining the classes or class methods.

The execution activity of class B can be monitored through the execution activity of its inherited methods, including its inherited Acme method 510b. To accomplish this, the class interceptor technique inserts an instrumented class X (indicated at 902x) as the new parent class of class B and as a new child class of class A. Class 902x contains a partially inherited and overridden class X Acme method 910x that contains instrumentation instructions that can effect any desired instrumentation function, e.g., recording the date and time of its invocation, incrementing or decrementing counters, setting a timer or recording an event for later analysis. Class 902x also contains its private copy of the Agua data 920x inherited from class 502a. These class X Acme method instrumentation instructions can execute before and/or after explicitly invoking the inherited Acme 510a, wherever in the class hierarchy it may reside, and may, for example, measure the time required for the inherited Acme method 510a to execute. Such instrumentation routines, and other diagnostic software, are conventional in the art. The inherited method invocation by the class X Acme method will ultimately be resolved to be the class A Acme method.

Class B is referred to as the target class. As a target method, the fully inherited class B Acme method 510b (as shown) can be monitored. The class interceptor technique need only identify a target class and a method that is fully or partially inherited by the target class. As previously explained, the invention can also assist with identifying a target class and their inherited methods by searching for classes satisfying a set of attributes and associated values.

For implementations involving the Java virtual machine, the class interceptor technique inserts the instrumented class 902x by interrupting and optionally suspending the operation of the Java virtual machine after loading and before linking the target class 502b. The virtual machine can be interrupted and optionally suspended by a procedure responding to the generation of an interrupt or trap associated with the loading of a particular class into memory. The JVMPI generates such event related interrupts or traps which can be responded to via a procedure that commands the Java virtual machine to stop execution until further notice. Instrumenting software 170 is executed to create and modify class related program structures.

All Java classes are represented by ClassFile data structures documented for example by the Java Virtual Machine Specification (Second Edition). These ClassFile structures contain the name of the represented class and the name of parent class of the represented class. To insert an instrumented class, a new generic ClassFile structure representing class X is created, and the parent class name within the ClassFile structure representing class X is modified to specify "class A". Methods inherited by class B from class A are also automatically inherited by class X when it is defined as a child of class A. These methods inherited by class X can each be modified to store instrumenting instructions that each partially inherit and override its inherited method from class A. These instrumented methods, with signatures matching methods inherited by class B, are automatically inherited by class X when it is defined to be a child of class A. The instrumented class X Acme method is classified as being partially inherited and overridden.

The ClassFile representing the target class B is modified so that its parent class name is changed to "class X". When loading and linking the virtual machine compiled software 110, the virtual machine linker contained within the virtual machine 120 now processes class X as a child of class A and class B as a child of class X. The instrumented class X Acme method 910x invokes the inherited Acme method 510a (without specifying the identity of the class from which it is inherited) via a symbolic method link. The virtual machine linker processes the class X symbolic method link by searching for the location of the nearest inheritable Acme method 510a and replacing it with a link to the class A Acme method 510a. The virtual machine linker also processes the class B symbolic method link by searching for the location of the nearest inheritable Acme method and replacing it with a link to the class X Acme method 910x.

Upon executing the linked executable program, instructions residing outside of class B that invoke the fully inherited class B Acme method 510b will actually invoke the class X Acme method 910x, fully inherited by class B. The class X Acme method 910x can optionally execute a first set of instrumentation instructions before executing an instruction to invoke its inherited Acme method, which is ultimately resolved to be the class A Acme method 510b by the virtual machine linker 120. Because the class A Acme method 510a is not inherited by class A from any other class hierarchically superior class, upon complete execution of the class A Acme method 510a, the path of execution will return to its invoker, the class X Acme method 910x.

The class X Acme method 910x can optionally continue to execute a second set of instrumentation instructions after executing the first set of instrumentation instructions before invoking its inherited method, ultimately determined to be the inheritable class A Acme method 510a. Upon complete execution of the instrumented class X Acme method 910x, the path of execution will return to its invoker, the software that invoked the class B Acme method 510b, wherever in the program that may be.

Alternatively, if the Class B Acme method was partially inherited and overridden as opposed to being fully inherited, instructions residing outside of class B that invoke the class B Acme method 510b would actually invoke overriding instructions residing in the class B Acme method before invoking any of the inherited class X Acme method 910x instructions. The class B Acme method instructions, would include an instruction invoking its inherited Acme method, ultimately determined to be the class X Acme method, which would execute as described above in the fully inherited Class B Acme method scenario. Upon complete execution of the instrumented class X Acme method 910x and any other ancestor methods, including the Class A method 510a, the path of execution would instead return to its invoker, the class B Acme method 510b. Upon complete execution of the class B Acme method 510b, the path of execution will return to the software invoking the class B method 510b, wherever in the program that may be.

For a partially inherited and overridden instrumented method, the first and second sets of instrumentation instructions are optional. If both are sets of instrumentation instructions are nonexistent, the method is not instrumented. If the method does not invoke its inherited method, then functionality is removed from the target software.

In the above example of the class interceptor technique, existing classes, methods and their instruction sequences, including those for the class A and class B Acme methods, were untouched and undisturbed by software instrumentation operating during their execution. No method or class resident sequences of instructions including bytecode were modified. In effect, both Class A and B Acme methods were "unaware" that their execution activity was being monitored. No source language code files or executable program files were modified. Moreover, there are no special instrumented versions of the source code or of the executable program files to store and maintain. All that the class interceptor technique requires is one or more methods that are inherited or shared between classes resident inside object oriented executable software.

The modification of instructions including bytecode stored anywhere within the program is particularly risky. The execution of previous bytecode instructions affects the interpretation future bytecode instructions. Furthermore, the memory address location of a bytecode instruction, referred to as an opcode, can affect whether or how it is executed. For example, with the Java programming language, some types of opcodes must reside a on 4 byte boundaries to be executed correctly, others may reside at 2 byte boundaries etc. Modifying, inserting or deleting existing instructions may cause a misalignment of one or more instruction opcodes that will likely cause significant, unacceptable and unpredictable program behavior. The bytecode stored within a method is stored within a sequenced set of memory address locations. This sequenced set of memory address locations typically reside contiguously in memory address space. Modifying bytecode involves either modifying the contents of a memory location within this sequence, or adding, removing, substituting or re-ordering memory address locations as members of this set. Any change to the exact sequence of method resident bytecode instructions can significantly and not so predictably alter the behavior of the software.

FIG. 10 illustrates the class doppelganger (CD) software instrumentation technique. The class doppelganger technique enables the execution activity of target class objects to be monitored by intercepting and monitoring the paths of execution entering the target class. Paths of execution entering the target class enter through one of its methods. A doppelganger class intercepts and monitors each path of execution "upstream" or before it enters the target class via one of its methods. The doppelganger technique can monitor paths of execution into the target class's methods regardless of how these methods are classified. Whether any of the target class methods are fully inherited, partially inherited and overridden or fully overridden is not relevant to the capabilities of the doppelganger technique. Like the class interceptor technique, the class doppelganger technique requires no access or modifications to existing instruction sequences (bytecode sequences), source language code files or to compiled executable files.

The execution activity of class B can be monitored by creating an instrumented class Y (indicated at 1002*y*), declaring class Y to be a child of class B, and then re-assigning names to class Y and class B such that class Y acts as an imposter or "doppelganger" of class B. For class Y to act as a doppelganger or ghost of class B, its generic ClassFile structure would be assigned the name class "B" while class B (indicated at 502*b*) would be assigned another name that is not in conflict with any other class name, such as, for example class "_B".

Class 1002*y* contains a method 1010*y* named Acme and a method 1012*y* named Bravo and a data type 1020*y* named Agua and a data type 1022*y* named Balloon. As a result of class inheritance, the child class 1002*y* can inherit or share the methods and data of its parent class 502*b*. Consequently, class 1002*y* can implicitly and effectively contain the Acme method 510*b* and Bravo method 512*b* that is inherited or defined in its parent class 502*b*. Class 1002*y* also contains a separate private copy of the Agua data type 1020*y* and of the Balloon data type 1022*y*.

Exercising this technique on class 502*b*, a program instruction residing outside class B that would attempt to invoke the class B Acme method 510*b* would actually invoke the class Y instrumented Acme method 1010*y*, where class Y is renamed to class "B" and class B is renamed class "_B" when instrumented with the doppelganger technique. The method 1110*y* would partially inherit and override the original class B Acme method 510*b*. The method 1010*y*, residing in the class originally named Y that was re-named to the class named "B", would optionally execute a first set of resident instrumented method instructions, as described above, then invoke the inherited Acme method from wherever it may reside within the class hierarchy, and then optionally execute a second set of resident instrumented method instructions before returning a status return output value to the program that originally attempted to invoke the original un-instrumented class B Acme method 510*b*.

As with the class interceptor technique, the original class Y instrumented instructions can, but are not limited to recording the date and time of its invocation, incrementing or decrementing counters, setting a timer or recording an event for later analysis. The first set of instrumented instructions executing before and the second set of instrumented instructions executing after invocation of the inherited Acme method can measure the time required for the inherited Acme method 510*b* residing in the class originally named "B" and re-named to the class named "_B", to execute (between the time of its invocation and the time of its termination).

Also as with the class interceptor technique, class B is the target class. The class interceptor technique requires the identity of a target class and a target method that is fully or partially inherited and overridden in the target class. Unlike the class interceptor technique, however, the class doppelganger technique does not require that the target class B methods 5 10*b* and 512*b* be inherited from another class. Nor does the class doppelganger technique restrict class B from inheriting some or all of its methods. Rather than exploiting a pre-existing target class inheritance relationship, the class doppelganger technique creates an inheritance relationship between the doppelganger class 1002*y* and the target class 502*b*, and then exploits this created inheritance relationship.

The invention can assist with identifying a target class and methods for any technique by conducting a search for classes and methods with various attributes and values during the processing of the in-memory representation of the program 140. Java language classes have associated attributes that include class name, interface name, parent class name, inherited method name, a defined method name, a private method name, an inherited field name, a defined field name, a private field name, constant value attribute, synthetic attribute, a code attribute, exception attribute or a depreciated attribute for example.

The instrumenting software 170 capable of reading and modifying class related program structures can read, interpret and determine an association between class attributes and classes to reveal a structural representation of the target program. From this information, target classes and methods can be selected for instrumentation. For example, class attributes for each class can be identified from information contained within the ClassFile and its related data structures associated with a particular class.

In embodiments involving the Java virtual machine, the class doppelganger technique inserts the instrumented class Y by interrupting and optionally suspending the operation of the Java virtual machine before linking the target class B. All Java classes are represented by the ClassFile and related data structures, which are documented by the Java Virtual Machine specification. These Class File structures contain the name of the represented class and the name of parent class of the represented class.

To insert an instrumented class, a new generic Class File structure representing class Y is created, and the parent class name within the ClassFile structure representing class Y is modified to specify class originally named B but renamed to class "_B" for the purpose of instrumentation. The newly created class Y, renamed to class "B", inherits any methods inherited or defined by the original class B. These original class Y resident methods that are inherited from original class B are modified to contain an optional first and second set of instrumenting instructions. Each original class Y resident method also invokes the inheritable version of each method inherited from the parent class B.

When loading and linking the virtual machine compiled software 110, the virtual machine linker contained within the virtual machine 120 now processes class Y as a child of class B. The instrumented class Y Acme method 1010*y* invokes the inherited Acme method (without knowing the identity of the class from which it is inherited) via a symbolic method link. The virtual machine linker processes the class Y Acme symbolic method link by searching for the location of the nearest inheritable Acme method within the class hierarchy and replacing the symbolic method link with a real method link to the original class B Acme method 510*b*. The virtual machine linker also processes the class B Acme symbolic method link by searching for the location of the nearest inheritable Acme method and replacing the symbolic method link with a real method link to the class A Acme method 510*a*.

Upon executing the linked executable program, instructions that invoke the Acme method 510*b* residing in the class originally named B that is re-named to "_B", will actually invoke the Acme method 1010y residing in the class originally named Y and re-named to B. The method 1010y will optionally execute a first set of instrumentation instructions before executing an instruction to invoke its inherited Acme method, which is ultimately resolved to be the class B Acme method 510b by the virtual machine linker 120.

The class B Acme method 510b will resolve to the class A Acme method 510a because it is fully inherited. Because the class A Acme method 510a is not inherited by class A from any other hierarchically superior ancestor class, upon complete execution of the class A Acme method 510a, the path of execution will return to its invoker, the Acme method 1010y residing in the class originally named Y and re-named to B.

The Acme method 1110y can optionally continue to execute a second set of instrumentation instructions after executing the instruction to invoke its inherited method, ultimately resolved to the class a Acme method 510a. Upon complete execution of the instrumented Acme method 1010y residing in the class originally named Y and re-named to B, the path of execution will return to the software that originally attempted to invoke the class B method 510b, wherever in the program that may be.

FIG. 11 is a diagram illustrating the internal components of class C, indicated at 1102c, and also shown as 110c in FIG. 1A. Class 1102c includes the methods identified as method D (indicated at 1110d), method E(indicated at 1110e) and method F (indicated at 1110f). Method D is invokable from outside class C. Method D separately invokes method E and method F via the method calls 1114e and 1114f respectively. Both method E and method F return the path of execution back to method D via method returns 1116e and 1116f respectively. All methods 1110d, 1110e and 1110f can access all class data 1120a–1120n.

The flow of execution 1102a enters class C by entering method D. From method D 1110d, the flow of execution 1114e enters method E 1110e. From method E 1110e, the flow of execution 1116e returns to method D 1110d. From method D 1110d, the flow of execution 1114f enters method F 1110f. From method F 1110f, the flow of execution 1104a exits class C 1102c and enters software external (not shown) to class C 1102c. From software external (not shown) to class C 1102c, the path of execution 1104b returns to class C 1102c by returning to method F 1110f. From method F 1110f the path of execution 1116f returns to method D 1110d. From method D 1110d, the path of execution 1102b exits class C 1102c.

Method 1110d acts as a path of execution entry point 1102a into class C from software residing outside the class 1102c. The class 1102c returns to the software residing outside the class 1102c via 1102b. Additionally method 1110f can act as a path of execution exit from class C to software residing outside class C via a method or function call 1104a made from method 1110f. A function is a callable routine, like a method that resides outside of any class generated objects. The path of execution of the method or function call 1104a returns via a method or function return 1104b.

FIG. 12 is a diagram illustrating the method hijacking (MH) software instrumentation technique using an instrumented class Z (indicated at 1202z). The method hijacking technique does not rely upon class inheritance to monitor the execution activity of class related objects. Instead, the method hijacking technique creates and adds instrumented methods directly to an in-memory copy of the un-instrumented target class C without requiring modification to the sequences of instructions residing in any of the of the methods residing inside the original or in-memory copy of target class C. Like the class interceptor and class doppelganger techniques, the method hijacking technique does not require modification to pre-existing class resident sequences of virtual machine or CPU instructions and requires no access or modifications to source code files or compiled executable files.

The execution activity of class 1102c, as illustrated in FIG. 11 can be monitored by creating an instrumented class as shown in FIG. 12 at 1202z that contains a superset of the internal components of the original un-instrumented class C. Class Z also provides the same external programming interfaces as class C so that it can equivalently function as class C within the context of the surrounding software 140 illustrated in FIG. 1A. Class Z includes methods with identical sequences of instructions as methods D, E, and F of class C. Methods D, E and F of class C are copied and renamed to method names "_D", "_E" and "_F" of class Z, respectively. Methods named "_D" 1110d, "_E" 1110e and "_F" 1010f of class Z each have the same instructions and method signature, except for their renamed method name, as methods D, E and F respectively, of the un-instrumented class C. Methods D, E, and F of class Z are instrumented.

Unlike the method named D of class C, the instructions of the method named D of class Z have been substituted with the instrumented instructions of method G 1210g. The method 1210g is renamed to the method named "D" in class Z. Unlike the method named E of class C, the instructions of the method named E of class Z has been substituted with the instrumented instructions of method H 1210h. The method 1210h is renamed to the method named "E" in class Z. Unlike the method named F 1110f of class C, the instruction body of the method named F of class Z has been substituted with the instrumented instructions of method I 1121i. The method 1210i is renamed to the method named "F" of class Z. Instrumented methods renamed E and F of class Z invoke methods named _E and _F of class Z via method calls 1214h and 1214i respectively.

The flow of execution 1202a enters class 1202z by entering method named D of class Z 1210g. The instrumented method named D of class Z invokes the method named _D of class Z via 1212d and 1213d respectively, in the same manner as software external to class C or Z would invoke the method named D of class C via 1102a. The method named _D of class Z invokes the instrumented methods named E and F of class Z via 1214e and 1214f respectively, in the same manner as the method named D of class C invokes the methods named E and F in class C via method calls 1114e and 1114f respectively. The instrumented methods named E and F of class Z invoke the methods named _E and _F of class Z via method calls 1214h and 1214i in the same manner as the method named D of class C invoked the methods named E and F of class C via method calls 1114e and 1114f respectively.

Both the methods named _E and _F of class Z return the path of execution back to the instrumented methods named E and F of class Z via 1216h and 1216i respectively, in the same manner as when returning the path of execution to the method named D of class C, via 1116e and 1116f. Methods named E and F of class Z return the path of execution to the method named _D in class Z via 1216e and 1216f in the same manner as the methods named E and F of class C return the path of execution to the method named D in class C via 1116e and 1116f respectively.

The method named _D class Z returns the path of execution to the instrumented method named D in class Z via 1213*d* in the same manner as the method D of class C returns the path of execution to software residing external to the class C that invoked the method named D of un-instrumented class C via 1102*b*. The path of execution of the method call 1210*g* returns to software residing external to the class Z 1202*z* via a method return 1202*b*.

Finally, the instrumented class Z, constructed from a copy of the un-instrumented class originally named C, is renamed to the class named "C". The original un-instrumented class named C is renamed to a class name, such as "_C" that is not in conflict with any other class names. The class named Z and instrumented class name C both refer to the same newly instrumented class copied from the original un-instrumented class C.

The virtual machine linker links and processes the instrumented class renamed C (class Z) as the un-instrumented class originally named C. External software resident outside of instrumented class C that invokes the method D of class C now unknowingly invokes the method 1210*g*, renamed to the method named "D" in instrumented class C (class Z). The method named D of the instrumented class C returns to the external software invoking the method named D in the same manner as the method named D of the un-instrumented class C.

The newly instrumented methods 1210*g* (G), 1210*h* (H) and 1210*i* (I) of instrumented class C (class Z) enable the path of execution associated with the original methods D, E and F, copied from un-instrumented class C into class Z as "_D", "_E" and "_F" respectively to be intercepted and monitored. The methods named _D, _E and _F of class Z have "no knowledge" that methods named D, E and F of class Z are intercepting and monitoring the paths of execution between methods _D, _E and _F of instrumented class C (class Z) and the path of excution between the instrumented class C (class Z) and the external software invoking its method named D.

Method 1210*g*, named D in class Z, is positioned to monitor the path of execution entry of the method named _D of class Z from external software invoking it and the path of execution return from the method name _D of class Z to the external software invoking it. Method 1210*h*, renamed method E in class Z, is positioned to monitor the path of execution entry of method _E from method named _D and the path of execution return from _E to the method named _D. Method 1210*i*, renamed "F" in class Z, is positioned to monitor the path of execution entry of the method named _F from the method named _D and the path of execution return from the method named _F to the method named _D. To intercept and monitor the path of execution between methods _D, _E and _F, the methods named D, E and F of class Z may be designed in the following manner.

Method 1210*g* is designed to adopt the method signature of the method named D in class C including its method name "D", and to include instructions that invoke the renamed method "_D" of class Z formerly named "D" of class C, and to include appropriate instrumentation related instructions before and/or after the invocation of method "_D" of class Z. Method D of class C is renamed to method _D of class Z, a name not in conflict with any other software resident class.

Method 1210*h*, renamed to "E" of class Z, is designed to adopt the method signature of the method named E in class C including its method name "E", and to include instructions that invoke the renamed method "_E" of class Z formerly named "E" of class C, and to include appropriate instrumentation related instructions before and/or after the invocation of method "_E" of class Z. Method E of class C is renamed to method _E of class Z, a name not in conflict with any other software resident class.

Method 1210*i*, renamed "F" of class Z, is designed to adopt the method signature of the method named F in class C including its method name "F", and to include instructions that invoke the method renamed to "_F" of class Z formerly named "F" of class C, and to include appropriate instrumentation related instructions before and/or after the invocation of method "_F" of class Z. Method F of class C is renamed to method "_$_F$" of class Z, a name not in conflict with any other software resident class.

Additionally method 1110*f* can act as a path of execution exit from class Z 1202*z* to software residing outside class Z via a method or function call 1204*a* made from method 1110*f*. A function is a callable routine, like a method that resides outside of any class generated objects. The path of execution of the method or function call 1204*a* returns via a method or function return 1204*b*. This path of execution class Z exit point can be monitored by inserting instrumentation into the software residing outside class Z, such as into a method or function call executed via path of execution 1204*a* and returning via 1204*b*.

This technique applies to methods not defined inside the original un-instrumented class. For example, if the method named "E" of class C was fully inherited and not overridden, the above described instrumented methods would still invoke and monitor it in the same manner as described above.

For example, the Java Virtual Machine Specification (Second Edition) documents ClassFile related virtual machine executable structures including the constant pool, field, method and attributes tables, the interface index array and other index arrays, access flags etc. Typically, at least one of these class related structures will need to be modified to implement any one of the class interceptor, method hijacking or the class interceptor techniques.

The Java Virtual Machine Specification documents various data structures that represent the internals of a virtual machine program. Names, such as class names, method names, field names etc., are represented by constant character string values. The structure type "Constant_Utf8_info" is a structure used to represent a name as a constant character string value. The "constant pool table" is a collection of "Constant_Utf8_info" structures each representing a Java program component name, such as a class name, method name or field name for example. This collection is organized as a series of Constant_Utf8_info structures. Each "Constant_Utf8_info" structure in the constant pool is identified by a "name index" which is an index into a constant pool table that identifies the order or sequence of a particular Constant_Utf8_info structure in the constant pool.

A "CONSTANT_Class_info" structure type is used to represent a Java class or interface. The "CONSTANT_Class_info" structure type contains a "name_index" member which is an index into the constant pool table to identify a character string representing an associated class or interface name.

A "method_info" structure type is used to represent a method within a Java class. The "method_info" structure type also contains a "name_index" member to identify a character string residing in a constant pool that contains the method name for the associated method.

A "field_info" structure type is used to represent a field or data element within a Java class. The "field_info" structure type also contains a "name_index" member to identify a character string residing in a constant pool that contains the field name for the associated field.

An "attribute_info" structure type is used to represent an attribute associated with a Java class, method or field. The "attribute_info" structure type also contains an "attribute_name_index" member to identify a character string residing in a constant pool that contains the attribute name for the associated attribute. There are various attribute types including those describing code, exception and source file attributes.

The "Code_attribute" structure type includes the actual instructions or bytecode of a particular method associated with this Code_attribute. Likewise, the "Exceptions_attribute" structure type describes exceptions associated with a particular method.

The "nameAndType_info" structure type represents a method or field and its associated descriptor. It contains a "name_index" and a "descriptor index" which are each an index into a constant pool table that identify the name of a method or field and the name of its associated descriptor. The "name_and_type_index" is an index into the constant pool table that identifies the name and descriptor of a method or field.

The "CONSTANT_Methodref_info" structure type associates a method with a class. The "CONSTANT_Methodref_info" contains a "class index" member which is an index into a constant pool table that identifies the name of a class or interface type associated with the method. This structure also contains a "name_and_type_index" member to identify the name and descriptor of the associated method.

The "CONSTANT_Fieldref_info" structure type associates a field with a class. The "CONSTANT_Methodref_info" contains a "class index" member which is an index into a constant pool table that identifies the name of a class or interface type associated with the field. This structure also contains a "name_and_type_index" member to identify the name and descriptor of the associated field.

The "ClassFile" structure type is associated with, a Java class. Each ClassFile structure includes a constant pool, access flags, a "this_class" pointer to itself, a "super_class" pointer to its parent ClassFile structure, a "methods" array of method_info structures, a "fields" array of field_info structures and an "attributes" array of attribute_info structures and an "interfaces" array. Reading and navigating through these and other related structures enables the instrumenting software to identify and modify portions of a Java virtual machine program. For example, methods can be added by allocating memory, copying and expanding the Class File and selected related structures. The constant pool associated within the ClassFile can be expanded with new Constant_Utf8_info structures representing new method names associated with new methods. New method_info structures can be created to represent new methods, new field_info structures can be created to represent new fields etc. New ClassFile and related structures can be created to represent new classes.

Although the present invention has been described and illustrated in detail, it is clearly understood that the same is by way of illustration and example only and is not to be taken by way of limitation of the spirit and scope of the present invention.

What is claimed is:

1. A method for instrumenting object-oriented virtual-machine-executable software comprised of class files containing bytecode including instructions, each class file being defined by a class and each class being associated with a class-hierarchy location and having a corresponding class name, the method comprising the steps of:
   (a) identifying a class included in the software as a target class wherein the target class is associated with a first class-hierarchy location and with a first class name;
   (b) instrumenting the target class by one of
      (i) creating a new instrumented class separate from the target class, adding instrumentation to the new instrumented class, and assigning the new instrumented class to a class-hierarchy location adjacent to and above the first class-hierarchy location of the target class, whereby the instructions of the target class remain in an original, unmodified form; and
      (ii) creating a new instrumented class separate from the target class, adding instrumentation to the new instrumented class, and assigning the new instrumented class to a class-hierarchy location adjacent to and below the first class-hierarchy location of the target class, assigning the first class name to the new instrumented class and assigning a second class name to the target class whereby the instructions of the target class remain in an original, unmodified form; and
      (iii) creating an instrumented class of the target class by adding instrumentation to the target class without modifying the instructions within the target class and retaining the first class name for the new instrumented class, whereby the target class becomes the instrumented class and the instructions of the target class remain in an original, unmodified form; and,
   (c) causing a virtual machine to process the class having the first class name as the target class.

2. The method of claim 1 including the following by the steps of:
   (aa) after completing step (a), operating a virtual machine to initiate loading and execution of the virtual machine executable software;
   (ab) after completing step (aa) suspending the operation of the virtual machine after loading and before linking the target class;
   (ca) after completing step (c), un-suspending operation of the virtual machine.

3. The method of claim 1 including the following by the steps of:
   (aa) after completing step (a), operating a virtual machine to initiate loading and execution of the virtual machine executable software;
   (ab) after completing step (aa) suspending the operation of the virtual machine after loading and before linking the target class to execute a software program that executes step (c);
   (ca) upon termination of the software program that executes step (c) resuming the operation of the virtual machine.

4. The method of claim 1 wherein the virtual-machine is a JAVA™ virtual machine and the step of identifying the target class included within the virtual machine executable software includes the steps of:
   (a) specifying a set of class attribute names and associated value descriptions matching class attribute names and associated values possessed by a class included in the virtual-machine-executable software; the set including an attribute name of a set of attribute names including
i. a class name,
ii. an interface name,
iii. a parent class name,
iv. an inherited method name,
v. a defined method name,
vi. a private method name,
vii. an inherited field name,
viii. a defined field name,
ix. a private field name,
x. a constant value attribute,
xi. a synthetic attribute,
xii. a code attribute,
xiii. an exception attribute, and
xiv. a depreciated attribute,
(b) searching for a class possessing a class attribute name and an associated value consistent with the set of specified class attribute name and associated value description; and
(c) classifying the class posessing a attribute name and an associated value consistent with the set of specified class attribute names and associated value description as the target class.

5. The method of claim 1 wherein the steps of suspending and un-suspending the operation of the virtual machine are performed using an interface provided by the virtual machine.

6. The method of claim 1 wherein the steps of suspending and un-suspending the operation of the virtual machine are performed using a virtual machine that is modified to perform this capability.

7. The method of claim 1 wherein the virtual machine is a JAVA™ virtual machine.

8. The method of claim 1 wherein the virtual-machine is a JAVA™ virtual machine and the steps of adding instrumentation to the target class include adding, removing, modifying, reordering or substituting a named class component of a set of named class components including:
(i) a class name,
(ii) a super class name,
(iii) a interface index array,
(iv) a field table,
(v) a method table,
(vi) a constant pool,
(vii) an attribute table,
(viii) an index array, and
(ix) access flags.

9. The method of claim 6 wherein the class component is represented by a plurality of memory locations, the step of modifying a class component including adding, removing, reordering or substituting a memory locations representing the class component or changing the content of a memory location representing the class component.

10. The method of claim 1 wherein the target class is represented by a plurality of memory locations, the step of adding instrumentation to the target class including adding, removing, or reordering or substituting a memory location representing the target class or changing the contents of a memory I location representing the target class.

11. The method of claim 1 wherein the step of assigning the new instrumented class to a class hierarchy location adjacent to and above the class hierarchy location associated with the target class includes:
modifying the new instrumented class to recognize a super class associated with the target class as the super class associated with the new instrumented class;
modifying the target class to recognize the new instrumented class as the super class associated with the target class.

12. The method of claim 1 wherein the step of assigning the new instrumented class to a class hierarchy location adjacent to and below the class hierarchy location associated with the target class includes modifying the new instrumented class to recognize the target class as the super class associated with the new instrumented class.

13. An apparatus for instrumenting object oriented virtual-machine-executable software comprised of class files containing bytecode including instructions, each class file being defined by a class and associated with a class-hierarchy location and having a corresponding class name, comprising:
(a) a target class identifier that identifies a class included in the software as a target class wherein the target class is associated with a first class-hierarchy location and with a first class name;
(b) an instrumenter instrumenting the bytecode of the target class by one of
(i) creating a new instrumented class separate from the target class, adding instrumentation to the new instrumented class, and assigning the new instrumented class to a class-hierarchy location adjacent to and above the first class-hierarchy location of the target class, whereby the instructions of the target class remain in an original, unmodified form;
(ii) creating a new instrumented class separate from the target class, adding instrumentation to the new instrumented class, and assigning the new instrumented class to a class-hierarchy location adjacent to and below the first class-hierarchy location of the target class, assigning the first class name to the new instrumented class and assigning a second class name to the target class, whereby the instructions of the target class remain in original, unmodified form; and
(iii) creating an instrumented class of the target class by adding instrumentation to the target class without modifying the instructions within the target class and retaining the first class name for the new instrumented class, whereby the target class becomes the instrumented class and the instructions of the target class remain in the original, unmodified form; and,
(c) a virtual machine for processing the class having the first name as the target class.

14. The apparatus for instrumenting object oriented virtual-machine-executable software of claim 13, further including class identification apparatus for identifying a class included within object oriented virtual-machine-executable software, the class identification apparatus comprising:
a class query engine which receives as input a set of class attribute names and associated value descriptions; and
a class searcher that sequentially searches classes included in the software and performs a predetermined action upon identifying a class that possesses a set of class attribute names and associated values that match the set of class attribute names and associated value descriptions as the target class.

* * * * *